United States Patent
Chang et al.

(10) Patent No.: US 11,473,014 B2
(45) Date of Patent: Oct. 18, 2022

(54) LIQUID-CRYSTAL LENS

(71) Applicant: MERCK PATENT GMBH, Darmstadt (DE)

(72) Inventors: Arnold (Jer-Wei) Chang, Tainan (TW); Roger (Chih-chieh) Chang, Taipei (TW); Ray (Kuang-Ting) Chou, Hsinchu (TW)

(73) Assignee: MERCK PATENT GMBH, Darmstadt (DE)

( * ) Notice: Subject to any disclaimer, the term of this patent is extended or adjusted under 35 U.S.C. 154(b) by 95 days.

(21) Appl. No.: 16/520,960

(22) Filed: Jul. 24, 2019

(65) Prior Publication Data
US 2020/0032142 A1    Jan. 30, 2020

(30) Foreign Application Priority Data
Jul. 24, 2018    (TW) .................. 107125456

(51) Int. Cl.
| | |
|---|---|
| *C09K 19/18* | (2006.01) |
| *C09K 19/12* | (2006.01) |
| *C09K 19/30* | (2006.01) |
| *C09K 19/54* | (2006.01) |
| *C09K 19/20* | (2006.01) |
| *C09K 19/34* | (2006.01) |
| *C09K 19/04* | (2006.01) |

(52) U.S. Cl.
CPC .............. *C09K 19/18* (2013.01); *C09K 19/12* (2013.01); *C09K 19/2028* (2013.01); *C09K 19/3048* (2013.01); *C09K 19/3059* (2013.01); *C09K 19/3068* (2013.01); *C09K 19/3405* (2013.01); *C09K 19/54* (2013.01); *C09K 2019/0407* (2013.01); *C09K 2019/0411* (2013.01); *C09K 2019/0425* (2013.01); *C09K 2019/0466* (2013.01); *C09K 2019/123* (2013.01); *C09K 2019/124* (2013.01); *C09K 2019/2035* (2013.01); *C09K 2019/301* (2013.01); *C09K 2019/3004* (2013.01); *C09K 2019/3009* (2013.01); *C09K 2019/3015* (2013.01); *C09K 2019/3025* (2013.01); *C09K 2019/3036* (2013.01); *C09K 2019/3051* (2013.01); *C09K 2019/3083* (2013.01); *C09K 2019/3422* (2013.01)

(58) Field of Classification Search
CPC .................... C09K 19/18; C09K 19/2007; C09K 19/2014; C09K 19/2028; C09K 2019/181; C09K 2019/183; C09K 2019/3063; C09K 2019/2035; C09K 2019/3083
See application file for complete search history.

(56) References Cited

U.S. PATENT DOCUMENTS

| | | | | |
|---|---|---|---|---|
| 6,753,045 | B2 * | 6/2004 | Suermann .............. | C09K 19/46 428/1.1 |
| 7,198,828 | B2 * | 4/2007 | Hirschmann .......... | C09K 19/46 428/1.1 |
| 8,349,209 | B2 | 1/2013 | Haseba et al. | |
| 8,349,415 | B2 * | 1/2013 | Kojima .................. | C09K 19/20 428/1.1 |
| 9,746,745 | B1 * | 8/2017 | Lin ........................ | C09K 19/18 |
| 2018/0171229 | A1 * | 6/2018 | Ohishi ............... | C09K 19/3059 |
| 2018/0171234 | A1 * | 6/2018 | Ohishi ................... | C09K 19/12 |

FOREIGN PATENT DOCUMENTS

| | | | | |
|---|---|---|---|---|
| CN | 101712874 A | * | 5/2010 | |
| CN | 104650927 A | * | 5/2015 | |
| CN | 104650927 A | | 5/2015 | |
| EP | 2006352 A1 | * | 12/2008 | ............. C09K 19/20 |
| EP | 2006352 B1 | | 12/2013 | |
| WO | 10022891 A1 | | 3/2010 | |
| WO | WO-2010022891 A | * | 3/2010 | ........... C09K 19/588 |
| WO | 18078078 A1 | | 5/2018 | |

OTHER PUBLICATIONS

English translation of CN 104650927. (Year: 2015).*
English translation of CN101712874. (Year: 2010).*
S. Sato 1979 Jpn. J. Appl. Phys. 18, 1679.
S. Sato, Optical Review, vol. 6, No. 6 (1999) 471-485.
Search report in corresponding EP application 19187473.4 dated Dec. 10, 2019 (pp. 1-8).
Office Action in corresponding EP application 19187473.4 dated Oct. 2, 2020 (pp. 1-15).

* cited by examiner

Primary Examiner — Chanceity N Robinson
Assistant Examiner — Anna Malloy
(74) Attorney, Agent, or Firm — Millen White Zelano and Branigan, PC; Csaba Henter

(57) ABSTRACT

A LC lens and a liquid-crystal medium used in said LC lens, wherein the medium contains one or more compounds of each of formulae I and II

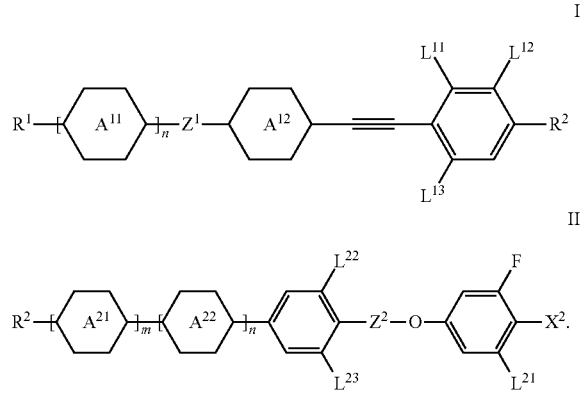

22 Claims, No Drawings

LIQUID-CRYSTAL LENS

The present invention relates to a liquid-crystal (LC) lens, a LC medium for use in liquid-crystal lenses and to devices comprising an LC lens according to the invention.

Electrically tunable liquid-crystal lenses potentially provide important advantages of size and cost over mechanical zoom lenses. Possible applications are in cameras, in sensors, binoculars, and other opto-electronic devices. The advantages are based on the properties of liquid crystal lenses, such as a small volume (i.e. thin shape), an electrically-tunable optical zoom, a fast response, and low energy consumption.

Generally, cameras, mobile-phone cameras or 3D image processing devices are disposed with varifocal lenses for magnifying or minimizing images. A conventional objective lens includes a plurality of lens groups. By movement of the lens groups along an optical axis, the distance between the lens groups is changed so as to change the focal length. Such kind of lens requires longer distances for the movement of the lens groups where the relationship of distances to be varied is non-linear. Thus, such a structure has difficulties in design, control precision, and the manufacturing cost is also high.

The application of liquid crystals (LC) to electrically tunable, variable-focusing lenses is known and described e.g. in S. Sato 1979 Jpn. J. Appl. Phys. 18, 1679; S. Sato, Optical Review, Vol. 6, No. 6 (1999) 471-485.

A liquid-crystal lens includes a liquid-crystal medium and a lens device. The birefringence and viscosity of the liquid-crystal medium directly influence the focal length and the speed of the electro-optical tuning of the lens. Conventional liquid-crystal media for displays usually have a birefringence of less than 0.2. A liquid-crystal medium with a birefringence greater than 0.2 should be used to satisfy the optical requirements of such a lens.

The LC lens can be realised e.g. with a lens-shaped LC layer on top of a concave or convex glass lens covered with ITO, and the focal length can be varied continuously from a value for an extraordinary ray to that for an ordinary ray by applying an electric field. The LC lens with variable focusing properties can also be realized using a plane-paralleled structure where the LC director is reoriented by an axially symmetric nonuniform electric field produced by a hole-patterned electrode structure. In U.S. Pat. No. 9,746,745 B1 a structured electrode is proposed for the same purpose which consists of a plurality of concentric ring electrodes that are used to control the birefringence distribution of the liquid-crystal material.

Another aspect of the invention is LC displays (LCDs). LCDs of various types all well-known and widely available in the market. The desire to display images providing a natural viewing experience for the observer recently has led to the introduction of displays capable of displaying three dimensional (3D) images for TV sets, as well as for monitors for desk-top and for lap-top computers and also for hand held devices such as for example mobile phones, tablet computers, and portable point of sale displays.

There are several techniques to render the 3D effects in such displays. A first classification can be made distinguishing between various techniques, which all require the observer to wear special glasses to observe the effect, and other techniques, using auto-stereoscopic display principles. The latter do not require the observer to wear glasses, no matter whether active, or passive type glasses.

To some observers the necessity of wearing glasses is rather inconvenient, especially those wearing optical (ophthalmic) glasses already.

Another disadvantage of the 3D rendering techniques requiring glasses is the fact that without glasses the observation is not possible at all and, hence, the maximum number of observers, who may view the display correctly at the same time, is limited by the number of glasses available at a time. Further, the surfaces of glasses are susceptible to degradation. Furthermore, in case of active glasses, which require the active and synchronized operation of the glasses as shutters or polarisation modifiers in matched timing with the panel displaying the image, there is a need to constantly provide the glasses with a synchronization signal. Further it is necessary to frequently recharge their batteries, unless a supply of energy is provided via "wiring" the observer, which can be even more uncomfortable. Due to these drawbacks of the various types of 3D technologies requiring the observer to wear special glasses, presently there is a high demand for displays capable of rendering 3D images without the necessity of using glasses.

Such "glasses-free" 3D techniques are called auto-stereoscopic displays. Currently, there are at least two different types of such displays under development. The first type is using a so-called "parallax barrier" in order to differentiate the pictures viewed by the right and by the left eye, respectively, provided by two separate channels of information. Said parallax barrier blocks for each eye the optical path of the displayed image created for the other eye.

The second type uses "lenticular lenses" to achieve this effect of the separation of the two channels. For this second type there are two different ways of practical realization.

In the first one, called "RM lens" herein, the lenticular lens is realized by the polymerization of an oriented reactive mesogen or mixture of reactive mesogens forming an anisotropic, polymeric liquid crystal lens. This technique, however, requires the use of an additional electro-optical switching element, e.g. a liquid crystal display, to provide the information for the optical image. This, in turn, leads to increased complexity of the design and to increased production costs.

In case the RM lenses are used to convert 2D images to 3D images or vice versa, an additional process to optically bond these 3D lenses to the panel switching the polarization, typically using UV irradiation is required in order to attach the 3D lenses. Thus, UV stability of LC media used is very important in many applications. The panel switching the polarization, together with the bonded RM lenses, typically are attached directly to the image creating panel, which preferable is an LCD.

In the second one, called "LC lens" herein, the lenticular lenses are created using a liquid-crystalline medium that is electrically addressed and used to alter its optical state and to directly display the optical information required for the two viewing channels. Such LC lenses are typically bonded directly to the image creating panel.

The $\Delta n$ is a key parameter of LC mixtures for the switchable 3D LC lens because it mainly influences on the quality (depth) of a 3D image and determines the required cell gap. With increasing $\Delta n$ its 3D depth is getting deeper and the cell gap used may be lower. Such a decreased cell gap helps both to reduce the driving voltage and to improve the alignment power, especially for relatively high cell gaps of some few tens of micrometers. In general, $\Delta n$ values in the range of 0.15 to 0.4, depending on the type and application, are required.

Once again, also for the "LC lens" type, there are two possible embodiments. In the first one, called "polymeric mould" type here, the liquid-crystalline material is embedded in a mould of a polymeric material. This polymeric material, which may be optically isotropic or anisotropic, typically is located on one of the substrates. The polymeric material is structured in a way to provide the space for the liquid crystal material in the inverse shape of the lenticular lenses to be realized. Typically, the polymeric material forms troughs of inverse lenticular lenses.

In a second embodiment and effect known as "electrically induced birefringence" (short EIB) is made use of. Here, the liquid crystal material is sandwiched between a pair of substrates, one of them being covered with electrodes, which may provide alternating voltages creating an electrical field in the plane of the device, like in an "in plane switching" (IPS) display or in a "fringe field switching" (FFS).

For the practical realization of 3D displays several difficulties have to be overcome with respect to the driving technology and the manufacturing process. In particular, improved liquid crystal materials fulfilling demanding specifications have to be provided. Here, liquid-crystalline media with improved performance for switchable 3D LC lenses are proposed. In the plastic mold type, the LC material is embedded into the mold. A relatively high value of Δn, typically in the order of 0.2~0.4 is required for this type of LC lens. Additionally, a relatively high value of the dielectric constant (Δε), of 9 or more, or, preferably, even of 40 or more, is typically required to reduce the operating voltage, cause by the comparatively large thickness, respectively cell gap. Also, an only moderately high rotational viscosity ($\gamma_1$) is required.

In EIB type the orientation of the LC molecules is directly controlled by the applied voltage. Thus, no extremely high values of Δn are required. Typically, the values of Δn should be in the range of from 0.15 to 0.25. Also, no large cell gap is required. Thus, also rather moderately high positive values of Δε of up to 5 are sufficient for this type of LC lenses. However, low values of $\gamma_1$ are required in order to achieve a fast response time (τ) especially for devices with multiple viewing points.

Yet another aspect of the present invention is to provide a liquid-crystal medium suitable for the use in Liquid-Crystal-on-Silicon (LCoS) panels or LCoS spatial light modulators (SLM).

As in the manufacturing processes typically UV irradiation is applied, the UV stability of the LC media used is very important in many applications.

The LC compositions known to date are afflicted with serious disadvantages for the use envisaged here. Besides other deficiencies, most of them result in disadvantageously small modulation of the optical response, slow response or inadequate addressability, requiring high operation voltages or inadequate stability, in particular against UV irradiation.

Novel liquid-crystalline media having improved properties are thus necessary. In particular, the modulation of the optical response, the response time, the operation voltage and the stability have to be improved.

In addition, there is a demand for an improvement in the low-temperature behaviour of the liquid-crystalline media. Both an improvement in the operating properties and also in the shelf life is necessary here.

Thus, there is a considerable demand for liquid-crystalline media having suitable properties for corresponding practical applications. In particular it is an object of the present invention to provide new materials having suitable properties for LC lenses enabling applications with improved properties.

The present invention relates to a liquid-crystal lens comprising a liquid crystal medium which contains
a) one or more compounds of formula I

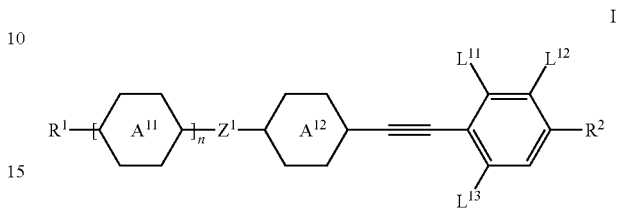

in which
$R^{11}$ and $R^{12}$ identically or differently, denote H, alkyl or alkoxy having 1 to 12 C atoms, or alkenyl, alkenyloxy or alkoxyalkyl having 2 to 12 C atoms, in which one or more CH$_2$-groups may be replaced by

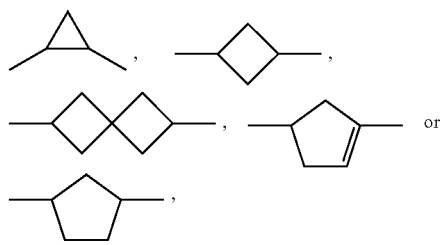

and in which one or more H atoms may be replaced by fluorine,
$L^{11}$, $L^{12}$, $L^{13}$ independently of one another, denote H, Cl or F,

denotes

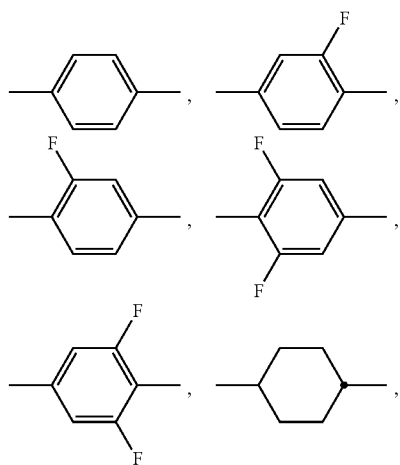

-continued

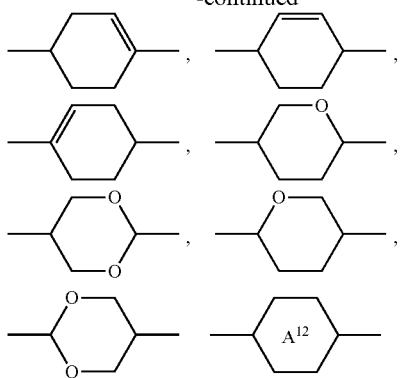

denotes

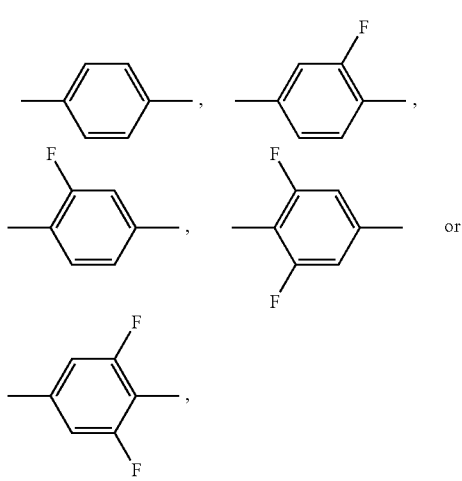

Z¹ denotes denote a single bond, —CH₂CH₂—, —CH=CH—, —CF₂O—, —OCF₂—, —CH₂O—, —OCH₂—, —COO—, —OCO—, —C₂F₄—, —CF=CF—, —CH=CHCH₂O—, n is 0 or 1;

and b) one or more compounds of formula II

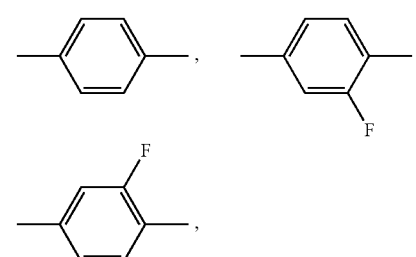
II wherein

R² has the meanings of R¹¹ above,

X² denotes F, Cl, CF₃, OCF₃, CN or NCS,

Z² denotes C=O or CF₂, preferably C=O.

L²¹, L²² and L²³ identically or differently, denote, H or F,

L² denotes H or alkyl having 1 to 6 C atoms, preferably H or methyl, particularly preferably H,

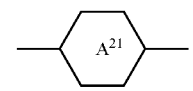

denotes

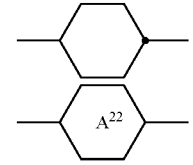

denotes

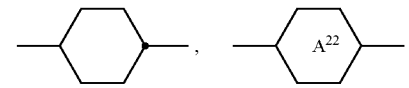

and, in case

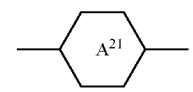

denotes

alternatively denotes m and n are, independently of each other, 0 or 1.

The medium according to the invention is distinguished by a high clearing point, a suitably high birefringence, a suitable dielectric anisotropy, a high stability of the voltage holding ratio against temperature and UV-load.

Due to the high clearing temperature the medium according to the invention is particularly suitable for mobile applications.

The medium according to the invention is distinguished by a surprisingly high extraordinary refractive index ($n_e$) which enables switchable lenses particularly for 2D/3D switchable displays with improved clarity of the 2D image.

Furthermore, the low dielectric anisotropy of the medium according to the invention compared to media for 3D application from the state of the art surprisingly enables switchable lens arrays with reduced cross-talk while maintaining a sufficiently high birefringence.

The present invention further relates to the LC medium described above and below.

The present invention further relates to the use of the LC lens according to the invention in various applications which require a high birefringence as for example TN display, STN display, PDLC display, phase modulator, camera, mobile phone camera, 3D LCD shutter glass, 3D display, LC lens, holographic projection system, LCoS spatial light modulator or component for high-frequency technology operable in the microwave range.

Preferred embodiments of the LC lens according to the invention are characterised by preferred LC media contained therein, as set forth below.

The compounds of formula I are preferably selected from the group of compounds of formulae I-1 to I-3, particularly preferably from formula I-3

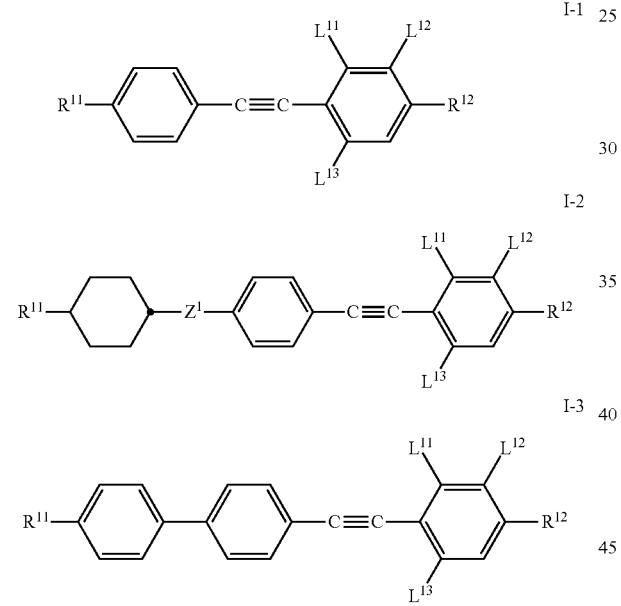

in which the occurring groups have the respective meanings given above under formula I, and in formulae I-1 and I-2 preferably $R^{11}$ is n-alkyl or alkenyl having up to 7 C atoms, most preferably n-alkyl having 1 to 5 C atoms, and $R^{12}$ is n-alkoxy or alkenyloxy having 1 to 6 C atoms, most preferably n-alkoxy having 1 to 4 C atoms, and in formula I-3 preferably $R^{11}$ is n-alkyl or alkenyl having up to 7 C atoms, most preferably n-alkyl having 1 to 5 C atoms, and $R^{12}$ is n-alkyl or alkenyl having up to 7 C atoms, most preferably n-alkyl having up to 5 C atoms.

The liquid-crystal media according to the present invention preferably comprise one or more compounds of formula I-1, preferably selected from the group of compounds of formulae I-1a to I-1d, preferably of formulae I-1a and/or I-1d, most preferably of formula I-1a,

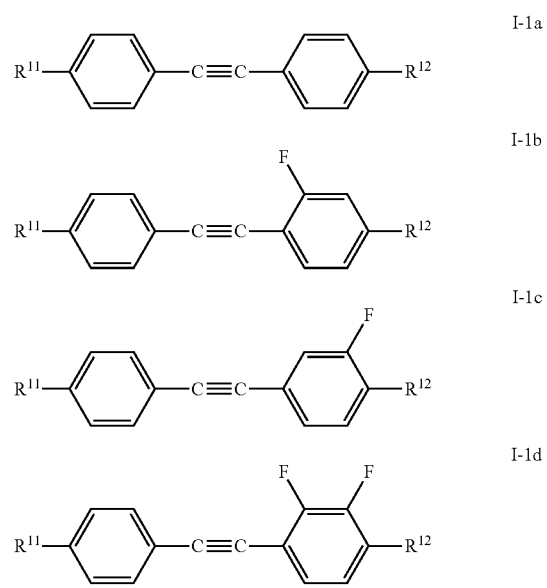

wherein the occurring groups have the meanings given above.

The liquid-crystal media according to the present invention preferably comprise one or more compounds of formula I-2, preferably selected from the group of compounds of formulae I-2a to I-2f, preferably of formulae I-2a and/or I-2d, most preferably of formula I-2a,

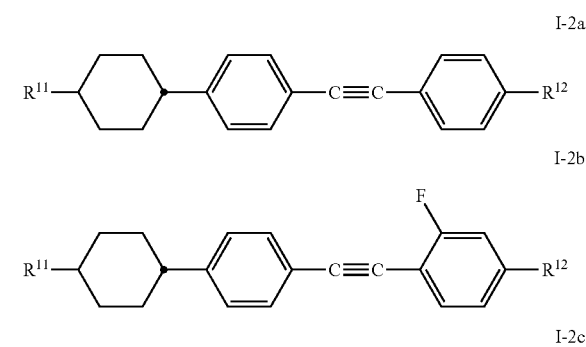

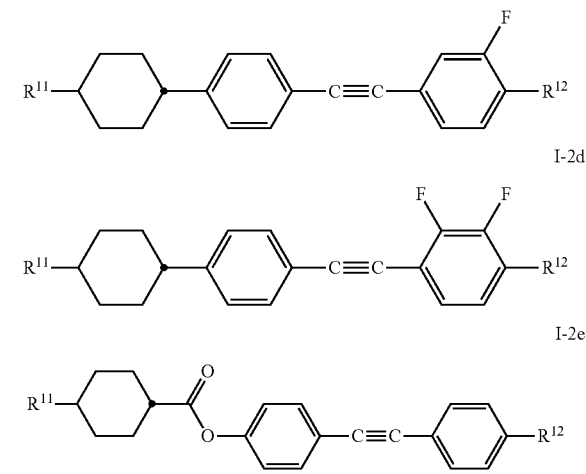

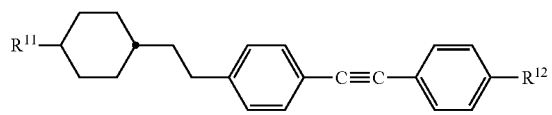

wherein the occurring groups have the respective meanings given above.

The liquid-crystal media according to the present invention preferably comprise one or more compounds of formula I-3, preferably selected from the group of compounds of formulae I-3a to I-3d, preferably of formulae I-3c and/or I-3c and/or I-3d, most preferably of formula I-3d,

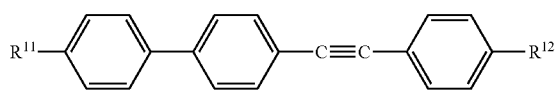

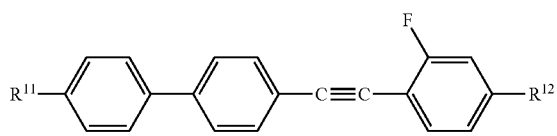

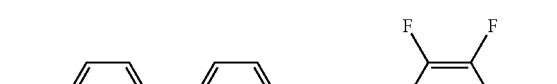

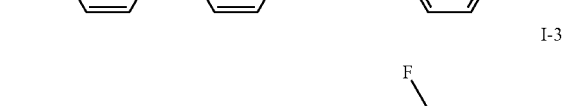

wherein the occurring groups have the respective meanings given above.

Very preferably, the medium comprises one or more compounds of formula I-3d.

The compounds of formula II are preferably selected from the compounds of the sub-formulae IIZ and IIQ, preferably IIZ:

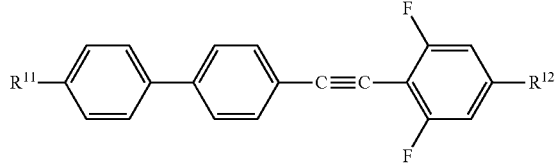

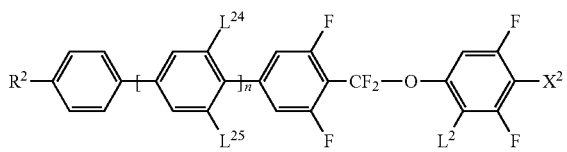

wherein the occurring groups and parameters have the respective meanings given above under formula I and preferably in formula IIZ $X^2$ denotes CN, NCS or $OCF_3$, most preferably CN and in formula IIQ $X^2$ denotes F, Cl or $OCF_3$, most preferably F, $L^{24}$ and $L^{25}$ identically or differently, denote H or F, The mesogenic media according to the present application comprise one or more compounds of formula IIZ preferably selected from the group of compounds of formulae IIZ-1 to IIZ-3, preferably one or more compounds of formula IIZ-1 and one or more compounds of selected from the group of compounds of formulae IIZ-2 and IIZ-3 and, in an especially preferred embodiment one or more compounds each of formulae IIZ-1, IIZ-2 and IIZ-3,

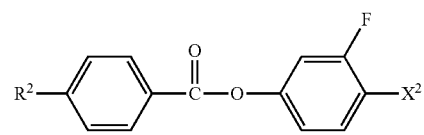

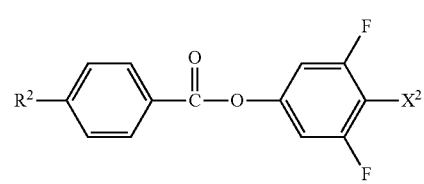

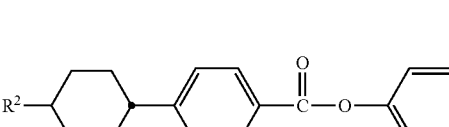

wherein the parameters have the meanings given above under formula IIZ and preferably $R^1$ is n-alkyl or alkenyl, in formulae IIZ-1 and IIZ-3 most preferably n-alkyl, and in formula IIZ-2 most preferably alkenyl, $X^1$ is CN, Cl or $CF_3$, most preferably CN.

In a preferred embodiment, the mesogenic media according to the present invention comprise one or more compounds of formula II preferably selected from the group of compounds of formulae IIQ-1 to IIQ-3, preferably selected from formulae IIQ-1 and IIQ-2 and, more preferably one or more compounds each of formula IIQ-1 and of formula IIQ-2,

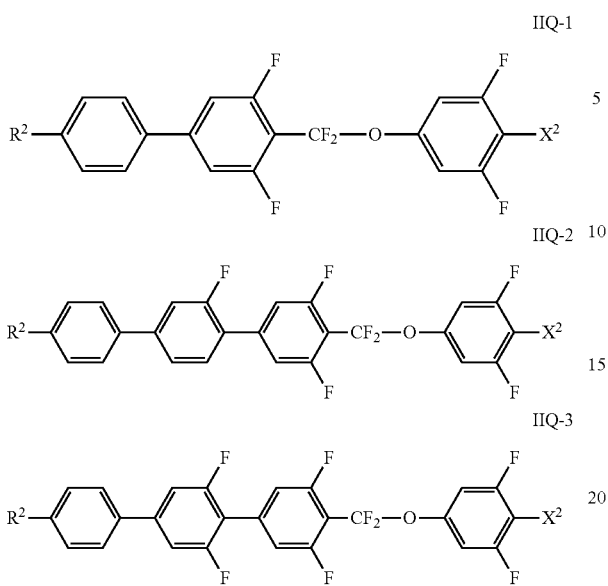

IIQ-1, IIQ-2, IIQ-3 wherein the occurring groups have the respective meanings given above under formula IIQ and preferably $R^2$ is n-alkyl or alkenyl, most preferably n-alkyl, and $X^1$ is F, Cl or $CF_3$, most preferably F.

Preferably, the medium according to the invention comprises one or more compounds selected from the group of formulae III and IV

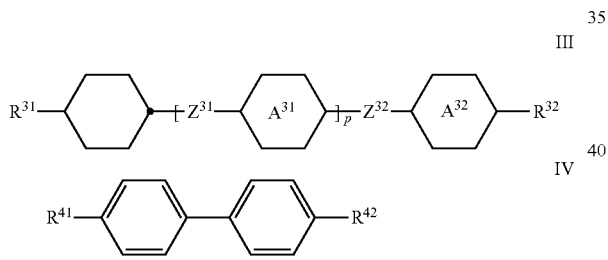

III, IV wherein $R^{31}$, $R^{32}$, $R^{41}$ and $R^{42}$ are independently of each other alkyl, which is straight chain or branched, preferably has 1 to 20 C-atoms, is non-substituted, mono- or poly-substituted by F, Cl or CN, preferably by F, and in which one or more $CH_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that O and/or S atoms are not linked directly to one another, preferably n-alkyl or n-alkoxy with 1 to 9 C-atoms, more preferably with 2 to 5 C-atoms; or alkenyl, alkenyloxy or alkoxyalkyl with 2 to 9 C-atoms, more preferably with 2 to 5 C-atoms or halogenated alkyl, halogenated alkenyl or halogenated alkoxy with preferably up to 9 C-atoms, preferably mono fluorinated, di-fluorinated or oligofluorinated alkyl, alkenyl or alkoxy with preferably up to 9 C-atoms, most preferably n-alkyl, n-alkoxy, alkenyl, alkenyloxy or alkoxyalkyl with preferably up to 9 C-atoms,

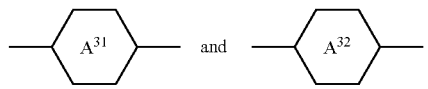

independently of each other, denote

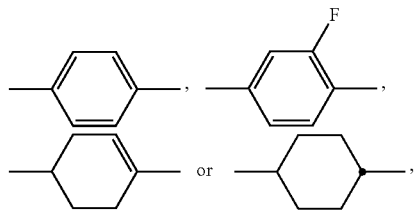

$Z^{31}$ and $Z^{32}$ on each occurrence, identically or differently, denote —$CH_2CH_2$—, —$CF_2CF_2$—, —$CF_2CH_2$—, —COO—, trans-CH=CH—, trans-CF=CF—, —$CH_2O$—, —$CF_2O$—, —C≡C— or a single bond, preferably at least one denotes a single bond p is 0 or 1.

Preferably the liquid-crystal media according to the present invention comprise one or more compounds of formula III preferably selected from the group of compounds of formulae of formulae III-1 to III-3:

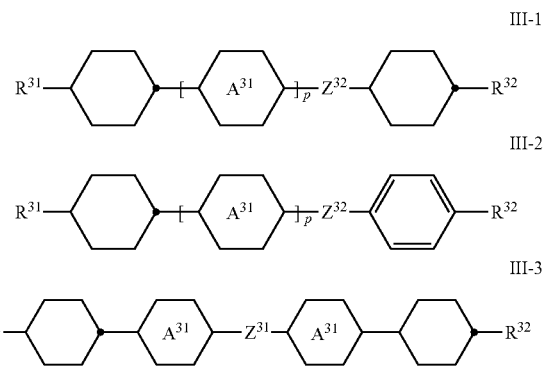

III-1, III-2, III-3 wherein the occurring groups have the respective meanings given above and preferably $Z^{31}$, $Z^{32}$ denote, identically or differently, —$CH_2O$—, —C(O)O— or a single bond, $R^{31}$ denotes non-fluorinated alkyl or non-fluorinated alkoxy, each having 1 to 9 C atoms, or non-fluorinated alkenyl, non-fluorinated alkenyloxy or non-fluorinated alkoxyalkyl, each having 2 to 9 C atoms, preferably alkyl, particularly preferably n-alkyl having 1 to 5 C atoms, $R^{32}$ denotes H, non-fluorinated alkyl or non-fluorinated alkoxy, each having 1 to 5, preferably 1 to 3, particularly preferably 3, C atoms, p is 0 or 1, more preferably $R^{31}$ denotes $C_nH_{2n+1}$ or $CH_2$=CH—$(CH_2)_Z$ and $R^{32}$ denotes $C_mH_{2m+1}$ or O—$C_mH_{2m+1}$ or $(CH_2)_Z$—CH=$CH_2$, in which n and m, independently of one another, denote an integer in the range from 0 to 20, preferably in the range from 1 to 9 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O-C_mH_{2m+1}$).

Preferably the liquid-crystal media according to the present invention comprise one or more compounds of formula III-1, preferably selected from the group of compounds of formulae of formulae III-1a to III-1c, preferably of formulae III-1a and/or III-1c, most preferably of formula III-1a,

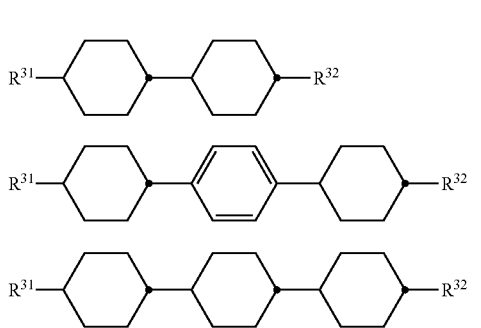

III-1a

III-1b

III-1c wherein the occurring groups have the respective meanings given above.

Preferably the liquid-crystal media according to the present invention comprise one or more compounds of formula III-2, preferably selected from the group of compounds of formulae of formulae III-2a to III-2d, preferably selected from formulae III-2a, III-2b and III-2d, most preferably of formula III-2a

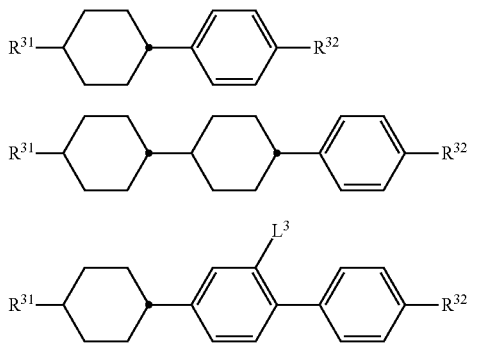

III-2a

III-2b

III-2c wherein the occurring groups have the respective meanings given above, and preferably $R^{31}$ denotes non-fluorinated alkyl or non-fluorinated alkoxy, each having 1 to 15 C atoms, or non-fluorinated alkenyl, non-fluorinated alkenyloxy or non-fluorinated alkoxyalkyl, each having 2 to 15 C atoms, preferably alkyl, particularly preferably n-alkyl, $R^{32}$ denotes H, non-fluorinated alkyl or non-fluorinated alkoxy, each having 1 to 5, preferably 1 to 3, particularly preferably 3, C atoms, more preferably $R^{31}$ denotes $C_nH_{2n+1}$ or $CH_2=CH-(CH_2)_z$ and $R^{32}$ denotes $C_mH_{2m+1}$ or $O-C_mH_{2m+1}$ or $(CH_2)_z-CH=CH_2$, in which n and m, independently of one another, denote an integer in the range from 0 to 15, preferably in the range from 1 to 7 and particularly preferably 1 to 5, and z denotes 0, 1, 2, 3 or 4, preferably 0 or 2.

The preferred combinations of ($R^{31}$ and $R^{32}$) here are, in particular, ($C_nH_{2n+1}$ and $C_mH_{2m+1}$) and ($C_nH_{2n+1}$ and $O-C_mH_{2m+1}$).

Preferably the liquid-crystal media according to the present invention comprise one or more compounds of formula III-3, preferably selected from the group of compounds of formulae of formulae III-3a to III-3d, particularly preferably of formula III-2a

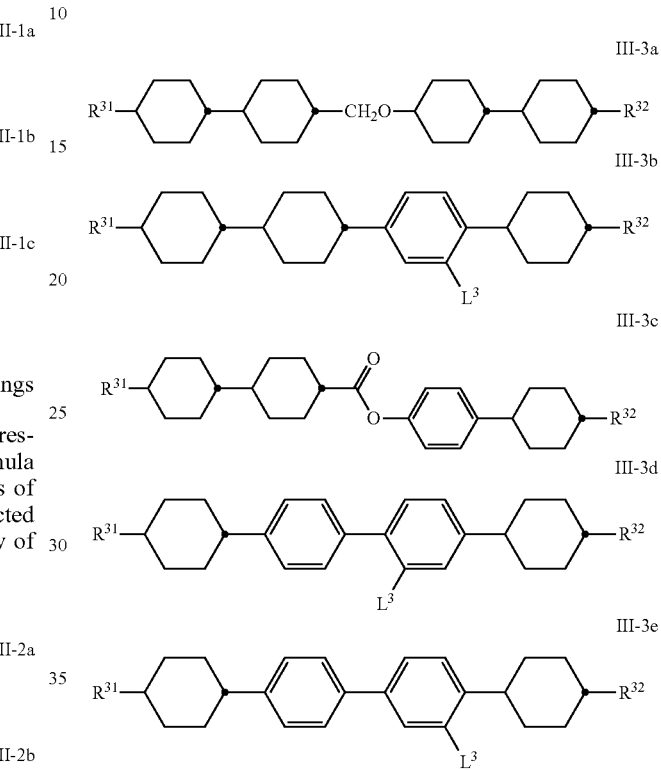

III-3a

III-3b

III-3c

III-3d

III-3e in which $L^3$ denotes H or F, preferably F, and $R^{31}$ and $R^{32}$ have the meanings given above, and preferably $R^{31}$ denotes non-fluorinated alkyl or non-fluorinated alkoxy, each having 1 to 15 C atoms, or non-fluorinated alkenyl, non-fluorinated alkenyloxy or non-fluorinated alkoxyalkyl, each having 2 to 15 C atoms, preferably alkyl, particularly preferably n-alkyl, $R^{32}$ denotes H, non-fluorinated alkyl or non-fluorinated alkoxy, each having 1 to 5, preferably 1 to 3, particularly preferably 3, C atoms, more preferably $R^{31}$ denotes $C_nH_{2n+1}$ or $CH_2=CH-(CH_2)_z$ and $R^{32}$ denotes $C_mH_{2m+1}$ or $O-C_mH_{2m+1}$ or $(CH_2)_z-CH=CH_2$, in which n and m, independently of one another, denote an integer in the range from 0 to 15, preferably in the range from 1 to 7 and particularly preferably 1 to 5, and z denotes 0, 1, 2, 3 or 4, preferably 0 or 2.

In a preferred embodiment of the present invention the liquid crystal media comprise one or more compounds of formula IV, preferably of compounds of formula IV, wherein $R^{41}$ is n-alkyl or alkenyl, more preferably n-alkyl, and, most preferably $C_nH_{2n+1}$, and $R^{42}$ is alkenyl, more preferably $CH_2=CH-[CH_2-]_z$, $CH_3-CH_2-CH=CH-[CH_2]_z$, $[-CH_2]_2-CH=CH_2$ or $[-CH_2]_2-CH=C-CH_3$, in which n is an integer in the range from 0 to 15, preferably in the range from 1 to 7 and particularly preferably 1 to 5, and
z is 0, 1, 2, 3 or 4, preferably 0 or 2.

The medium according to the invention preferably comprises one or more compounds of formula V

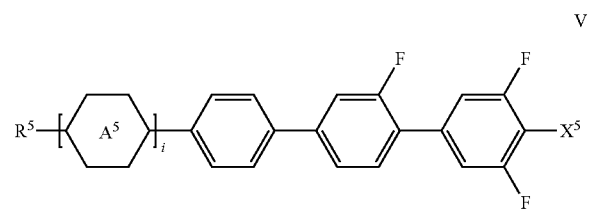

wherein

is

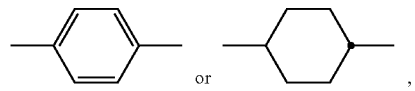

preferably

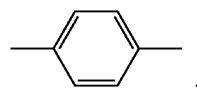

$R^5$ are independently of each other alkyl, which is straight chain or branched, preferably has 1 to 20 C-atoms, is non-substituted, mono- or poly-substituted by F, Cl or CN, preferably by F, and in which one or more $CH_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that O and/or S atoms are not linked directly to one another, preferably n-alkyl or n-alkoxy with 1 to 9 C-atoms, more preferably with 2 to 5 C-atoms; or alkenyl, alkenyloxy or alkoxyalkyl with 2 to 9 C-atoms, more preferably with 2 to 5 C-atoms or halogenated alkyl, halogenated alkenyl or halogenated alkoxy with preferably up to 9 C-atoms, preferably mono fluorinated, di-fluorinated or oligofluorinated alkyl, alkenyl or alkoxy with preferably up to 9 C-atoms,
most preferably n-alkyl, n-alkoxy, alkenyl, alkenyloxy or alkoxyalkyl with preferably up to 9 C-atoms,
$X^5$ is halogen, CN, NCS, $CF_3$ or $OCF_3$, preferably F or $OCF_3$, and
i is 0 or 1.

The liquid-crystal media according to the present invention comprise one or more compounds of formula I preferably selected from the group of compounds of formulae I-1 to I-3, preferably selected from formulae I-1 and I-2 and, more preferably one or more compounds each of formula I-1 and of formula I-2.

The liquid-crystal media according to the present invention comprise one or more compounds of formula V preferably selected from the group of compounds of formulae V-1 to V-3, preferably selected from formulae V-1 and I-3 and, more preferably one or more compounds of formula V-1,

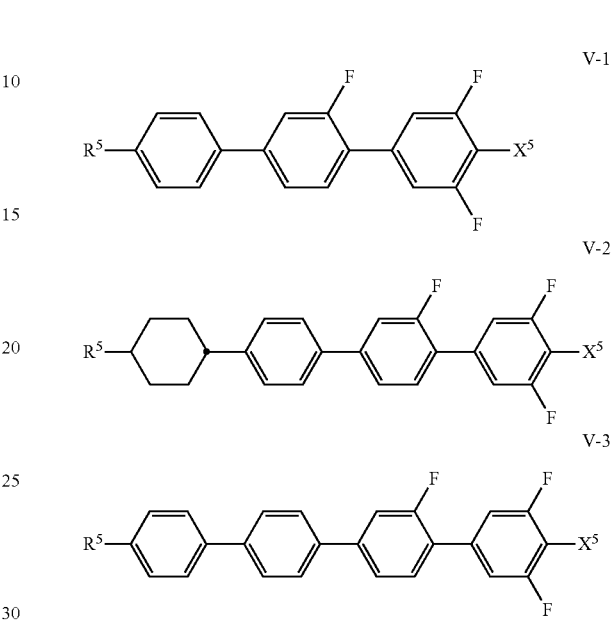

wherein the occurring groups have the respective meanings given above, and preferably
$R^5$ denotes non-fluorinated alkyl or non-fluorinated alkoxy, each having 1 to 15 C atoms, or non-fluorinated alkenyl, non-fluorinated alkenyloxy or non-fluorinated alkoxyalkyl, each having 2 to 15 C atoms, preferably alkyl, particularly preferably n-alkyl, and
$X^5$ denotes F, $CF_3$ or $OCF_3$, H, preferably $OCF_3$.

In a preferred embodiment of the present invention the medium comprises one or more compounds of formula VI

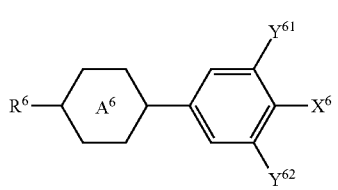

in which

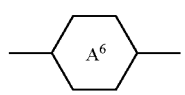

denotes

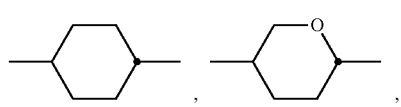

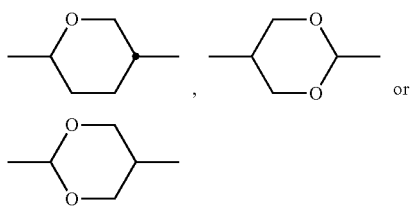

R⁶ denotes H, alkyl or alkoxy having 1 to 12 C atoms, or alkenyl, alkenyloxy or alkoxyalkyl having 2 to 12 C atoms, in which one or more CH$_2$-groups may be replaced by

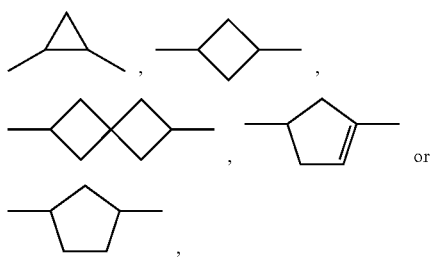

and in all of which one or more H atoms may be replaced by fluorine, $X^6$ denotes CN, F, CF$_3$ or OCF$_3$, preferably CN, and $Y^{61}$, $Y^{62}$ denotes H, Cl or F.

Preferred compounds of formula VI are the following compounds VI-1 to VI-8, particularly preferably formula VI-3

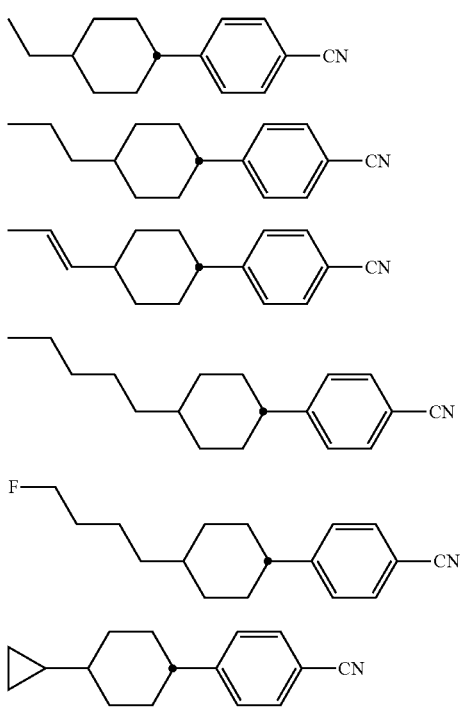

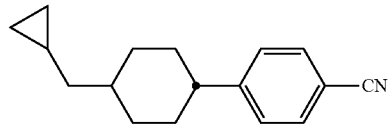

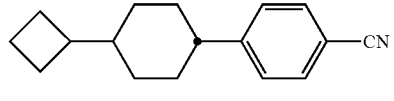

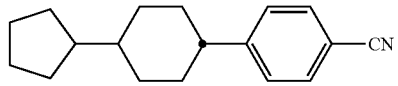

In a preferred embodiment, the medium according to the invention comprises one or more compounds selected from the group of compounds of formulae VII, VIII and IX,

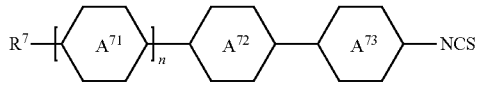

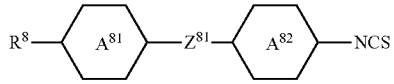

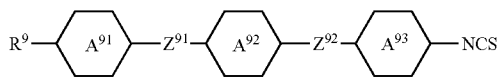

in which $R^7$ denotes H, unfluorinated alkyl or unfluorinated alkoxy having 1 to 17, preferably 3 to 10 C atoms, or unfluorinated alkenyl, unfluorinated alkenyloxy or unfluorinated alkoxyalkyl having 2 to 15, preferably 3 to 10, C atoms, in which one or more CH$_2$— groups may be replaced by

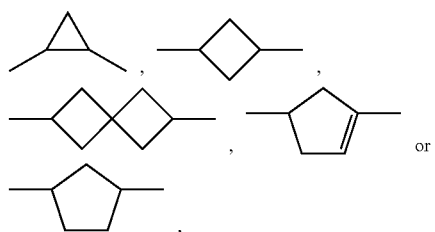

preferably unfluorinated alkyl or unfluorinated alkenyl, n is 0, 1 or 2,

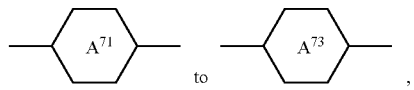

on each occurrence, independently of one another, denote

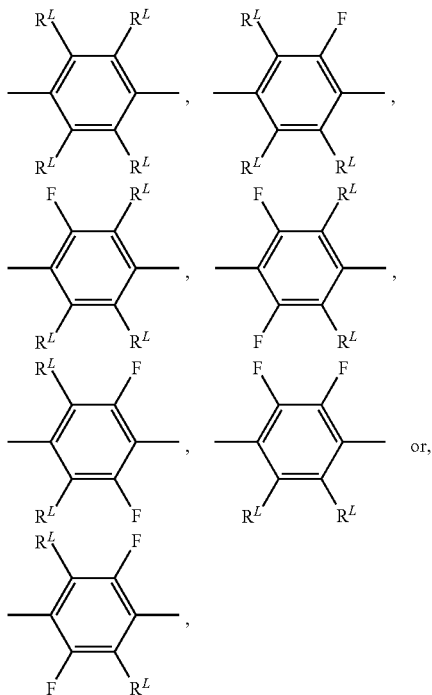

in which $R^L$, on each occurrence, identically or differently, denotes H or alkyl having 1 to 6 C atoms, preferably H, methyl or ethyl, particularly preferably H, and wherein

alternatively denotes

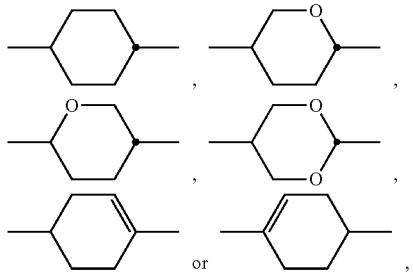

preferably

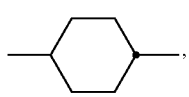

and in case n=2, one of

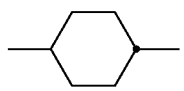

preferably denotes

and the other preferably denotes

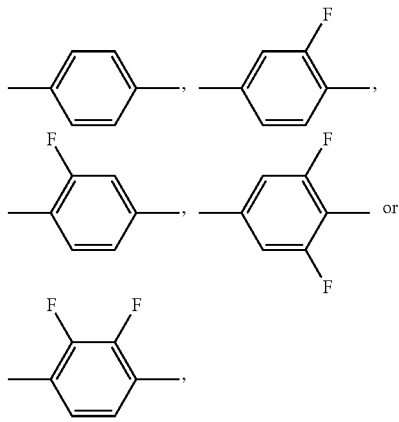

preferably

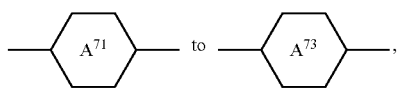

independently of one another, denote

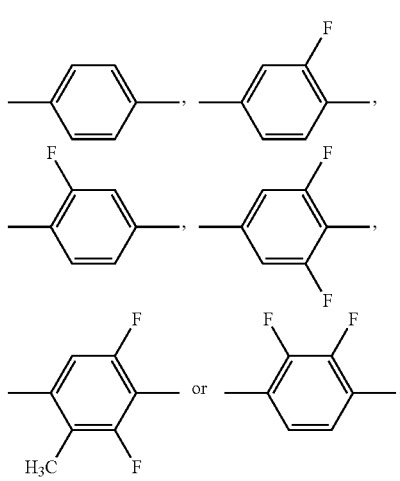

more preferably

denotes

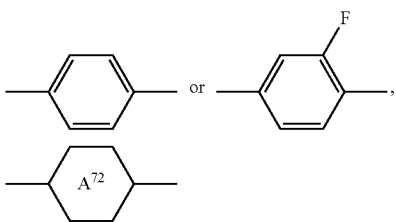

denotes

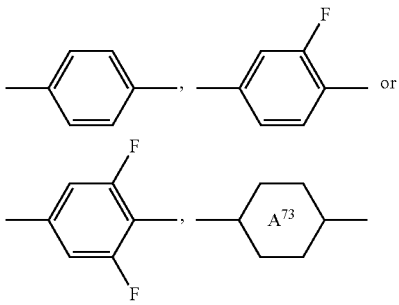

denotes

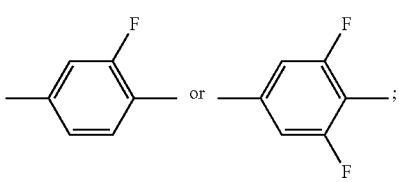

R⁸ denotes H, unfluorinated alkyl or unfluorinated alkoxy having 1 to 17, preferably 3 to 10 C atoms, or unfluorinated alkenyl, unfluorinated alkenyloxy or unfluorinated alkoxyalkyl having 2 to 15, preferably 3 to 10, C atoms, in which one or more CH$_2$-groups may be replaced by

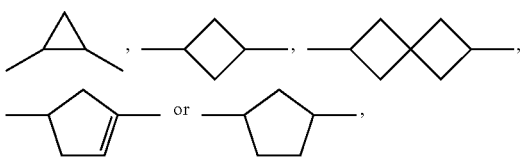

preferably unfluorinated alkyl or unfluorinated alkenyl, $Z^{81}$ denotes trans-CH=CH—, trans-CF=CF— or —C≡C—, preferably —C≡C— or trans-CH=CH—, and

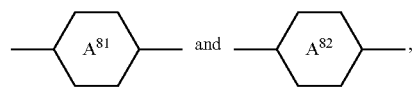

independently of one another, denote

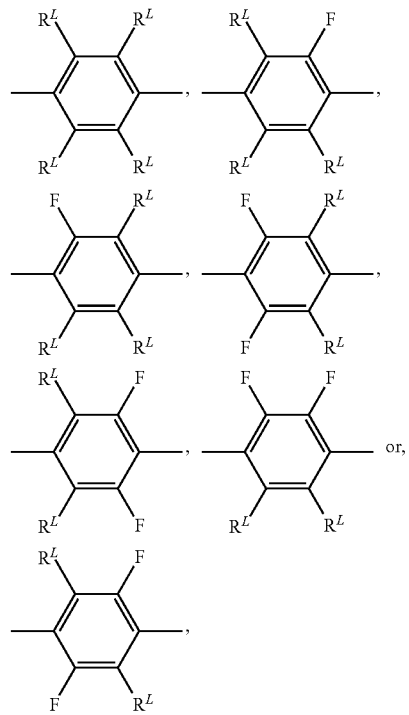

in which $R^L$, on each occurrence, identically or differently, denotes H or alkyl having 1 to 6 C atoms, preferably H, methyl or ethyl, particularly preferably H, and wherein preferably

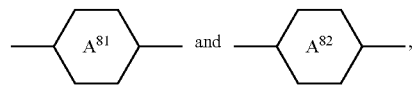

independently of one another, denote

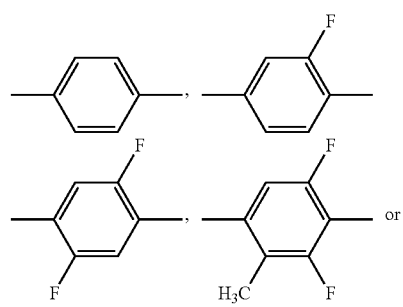

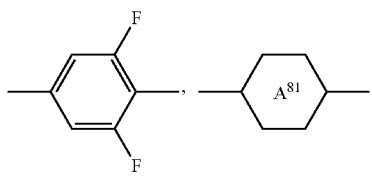

preferably denotes

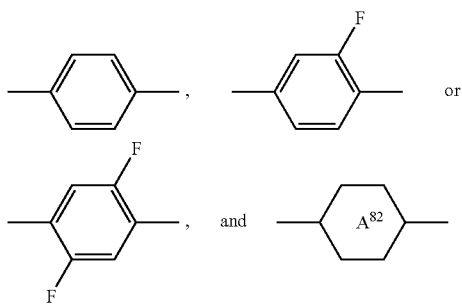

preferably denotes

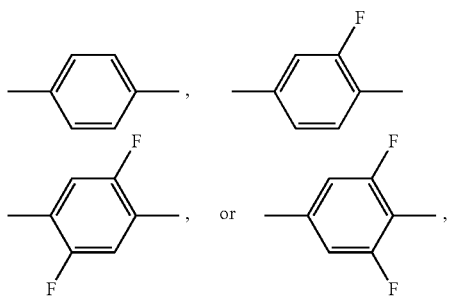

more preferably

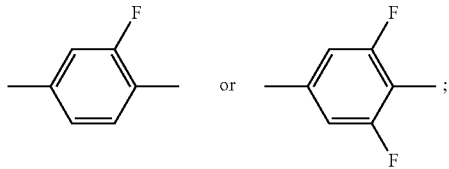

$R^9$ denotes H, unfluorinated alkyl or unfluorinated alkoxy having 1 to 17, preferably 3 to 10 C atoms, or unfluorinated alkenyl, unfluorinated alkenyloxy or unfluorinated alkoxyalkyl having 2 to 15, preferably 3 to 10, C atoms, in which one or more $CH_2$-groups may be replaced by

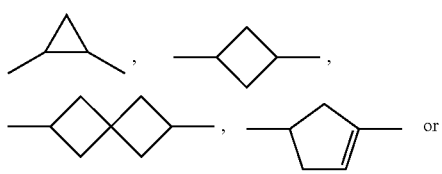

preferably unfluorinated alkyl or unfluorinated alkenyl, one of $Z^{91}$ and $Z^{92}$, preferably $Z^{92}$; denotes trans-CH=CH—, trans-CF=CF— or —C≡C— and the other one, independently thereof, denotes —C≡C—, trans-CH=CH—, trans-CF=CF— or a single bond, preferably one of them, preferably $Z^{32}$; denotes —C≡C— or trans-CH=CH— and the other denotes a single bond, and

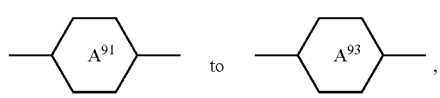

independently of one another, denote

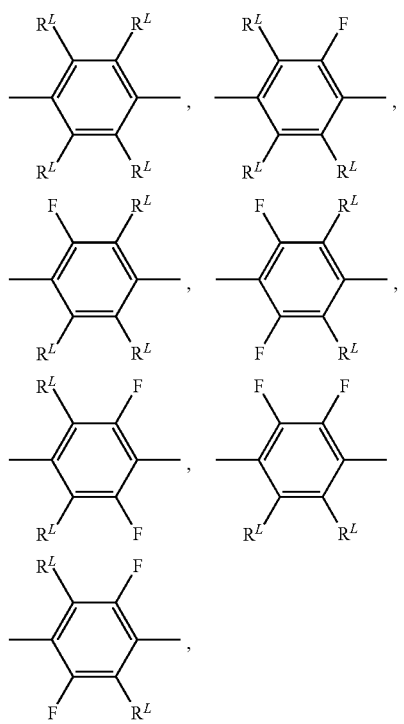

in which $R^L$, on each occurrence, identically or differently, denotes H or alkyl having 1 to 6 C atoms, preferably H, methyl or ethyl, particularly preferably H, and wherein

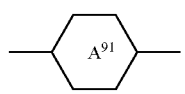

alternatively denotes

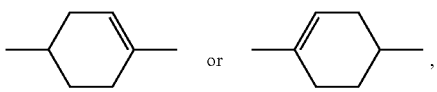

preferably

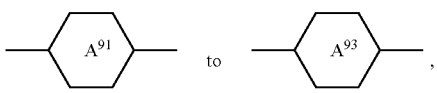

independently of one another, denote

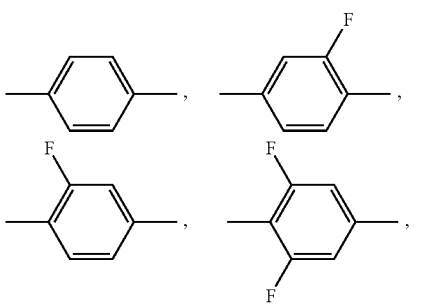

more preferably

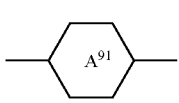

denotes

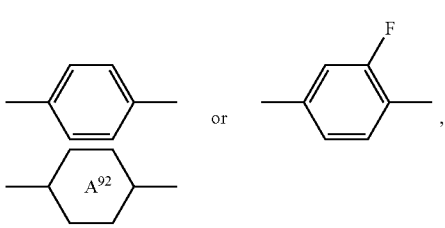

denotes

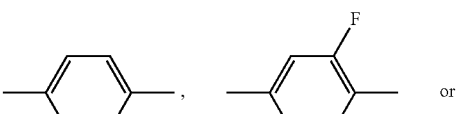

and
more preferably

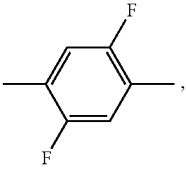

denotes

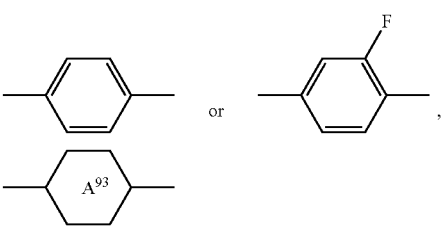

more preferably

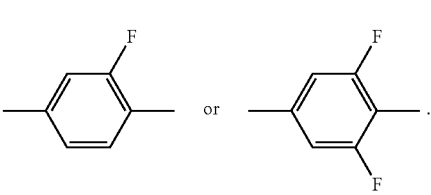

In the compounds of formulae VII, VIII and IX $R^L$ preferably denotes H.

In another preferred embodiment, in the compounds of formulae VII, VIII and IX, one or two groups $R^L$, preferably one group $R^L$ is different from H.

In a preferred embodiment of the present invention, the compounds of formula VII are selected from the group of compounds of the formulae VII-1 to VII-5:

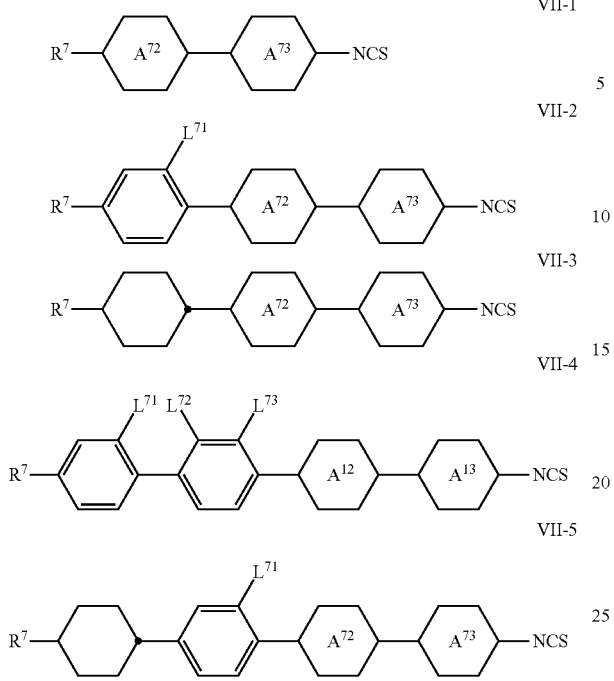

VII-1

VII-2

VII-3

VII-4

VII-5 in which
L$^{71}$, L$^{72}$ and L$^{73}$ on each occurrence, identically or differently, denote H or F,
and the other groups have the respective meanings indicated above for formula I and preferably
R$^7$ denotes unfluorinated alkyl having 1 to 7 C atoms or unfluorinated alkenyl having 2 to 7 C atoms.

The media preferably comprise one or more compounds of formula VII-1, which are preferably selected from the group of the compounds of the formulae VII-1a to VII-1f, preferably of formula VII-1b or VII-1f:

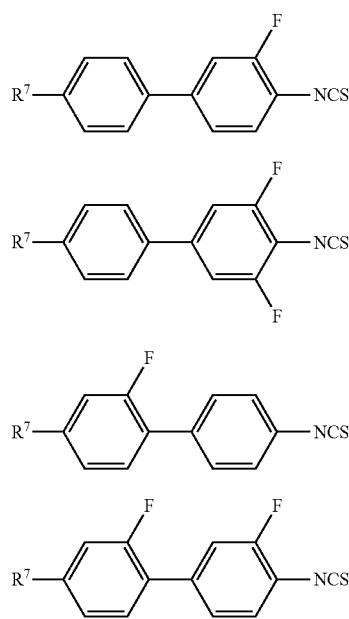

VII-1a

VII-1b

VII-1c

VII-1d

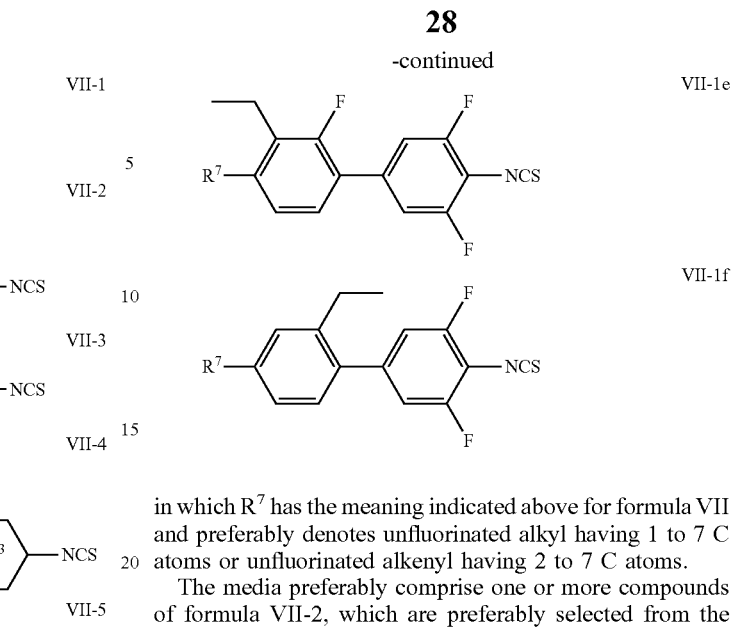

VII-1e

VII-1f in which R$^7$ has the meaning indicated above for formula VII and preferably denotes unfluorinated alkyl having 1 to 7 C atoms or unfluorinated alkenyl having 2 to 7 C atoms.

The media preferably comprise one or more compounds of formula VII-2, which are preferably selected from the group of the compounds of the formulae VII-2a to VII-2e, preferably of formula VII-2c:

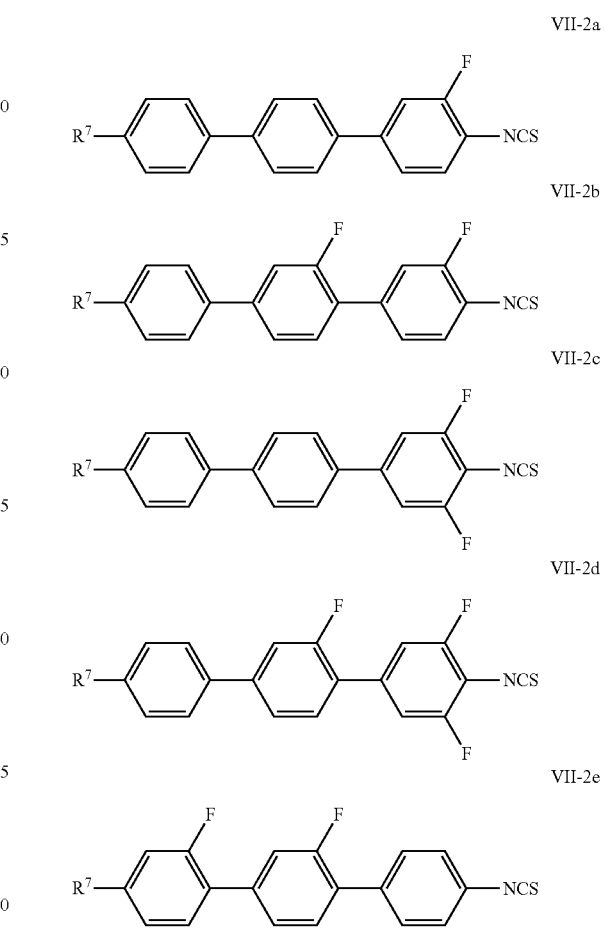

VII-2a

VII-2b

VII-2c

VII-2d

VII-2e in which R$^7$ has the meaning indicated above for formula VII and preferably denotes unfluorinated alkyl having 1 to 7 C atoms or unfluorinated alkenyl having 2 to 7 C atoms.

The media preferably comprise one or more compounds of formula VII-3, which are preferably selected from the group of the compounds of the formulae VII-3a to VII-3d, particularly preferably of formula VII-3b:

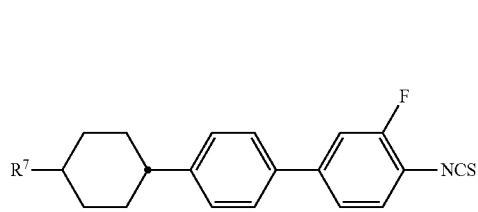

VII-3a

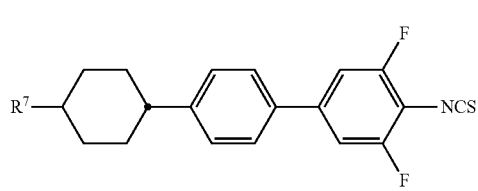

VII-3b

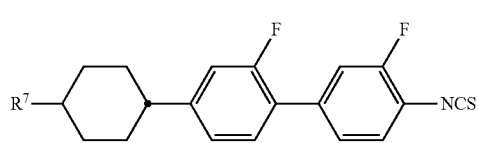

VII-3c

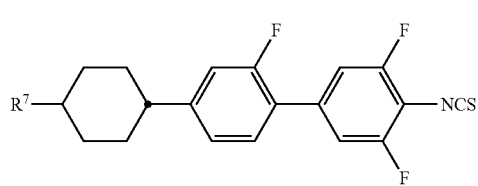

VII-3d in which R⁷ has the meaning indicated above for formula VII and preferably denotes unfluorinated alkyl having 1 to 7 C atoms or unfluorinated alkenyl having 2 to 7 C atoms.

The media preferably comprise one or more compounds of formula VII-4, which are preferably selected from the group of the compounds of the formulae VII-4a to VII-4d, particularly preferably of formula VII-4b:

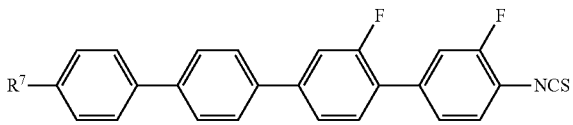

VII-4a

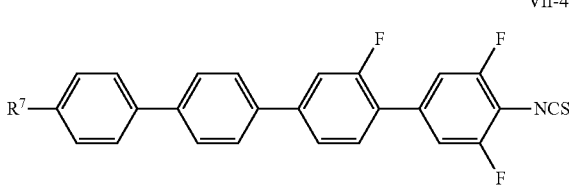

VII-4b

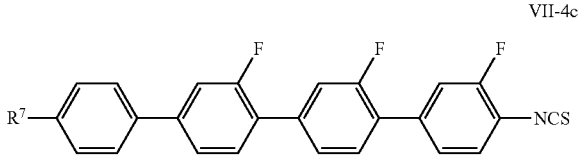

VII-4c

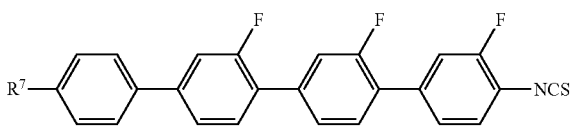

VII-4d

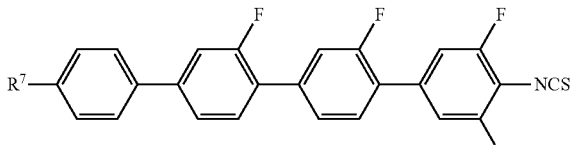

VII-4e

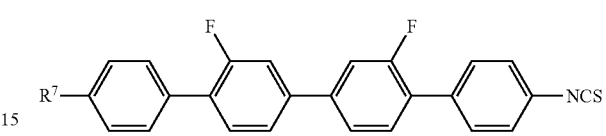

in which R⁷ has the meaning indicated above for formula VII and preferably denotes unfluorinated alkyl having 1 to 7 C atoms or unfluorinated alkenyl having 2 to 7 C atoms.

The media preferably comprise one or more compounds of formula VII-5, which are preferably selected from the group of the compounds of the formulae VII-5a to VII-5d, particularly preferably of formula VII-5b:

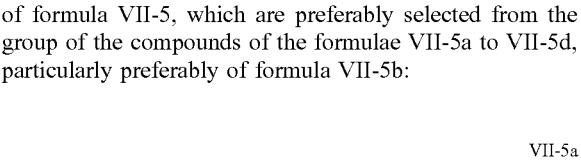

VII-5a

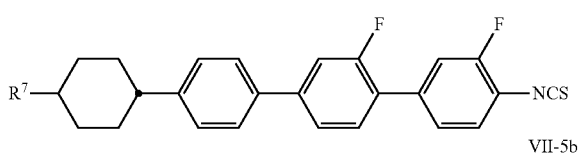

VII-5b

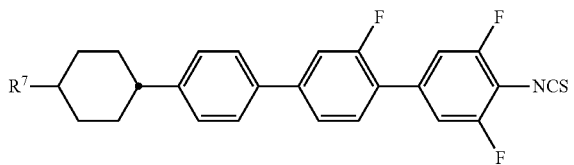

VII-5c

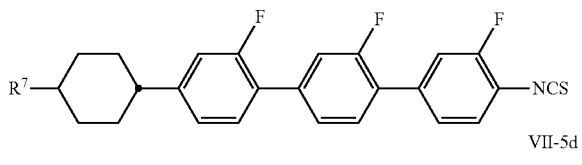

VII-5d

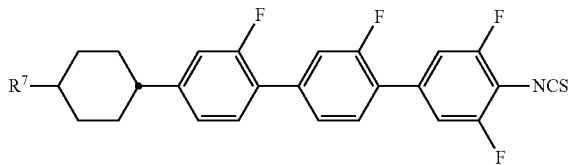

in which R⁷ has the meaning indicated above for formula VII and preferably denotes unfluorinated alkyl having 1 to 7 C atoms or unfluorinated alkenyl having 2 to 7 C atoms.

The media preferably comprise one or more compounds of formula VIII, which are preferably selected from the group of the compounds of the formulae VIII-1 to VIII-3, preferably selected from the group of the compounds of the formulae VIII-1 and VIII-2:

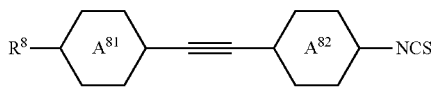 VIII-1

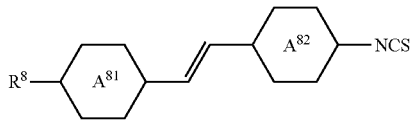 VIII-2

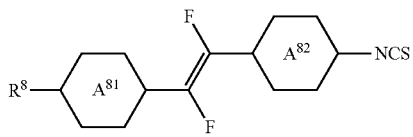 VIII-3 in which the parameters have the meanings given under formula VIII above and preferably R$^8$ denotes H, unfluorinated alkyl or alkoxy having 1 to 7 C atoms or unfluorinated alkenyl having 2 to 7 C atoms, and one of

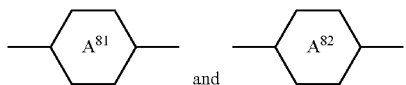

denotes

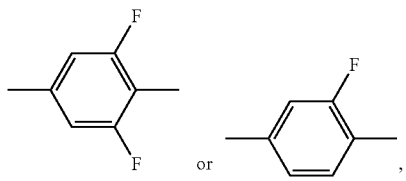

and the other, independently denotes

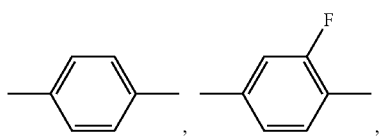,

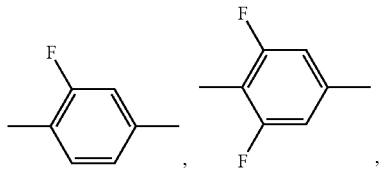,

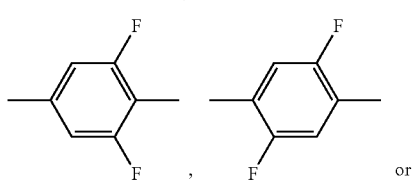 or

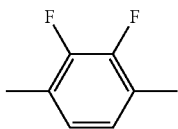, preferably

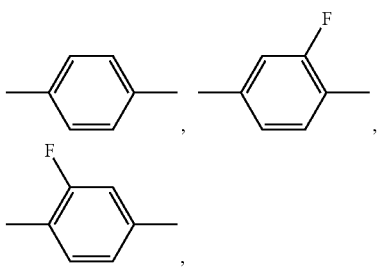, most preferably

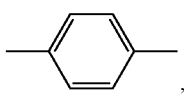, and preferably

R$^8$ denotes $C_nH_{2n+1}$ or $CH_2$=CH—$(CH_2)_z$, and n denotes an integer in the range from 0 to 15, preferably in the range from 1 to 7 and particularly preferably 1 to 5, and z denotes 0, 1, 2, 3 or 4, preferably 0 or 2.

The compounds of formula VIII-1 are preferably selected from the group of the compounds of the formulae VIII-1a to VIII-1e:

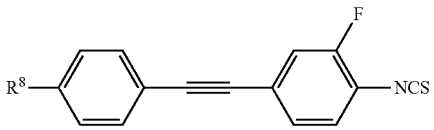 VIII-1a

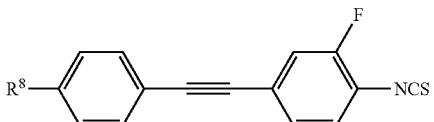 VIII-1b

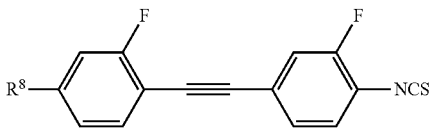 VIII-1c

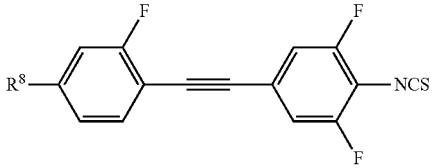 VIII-1d

VIII-1e
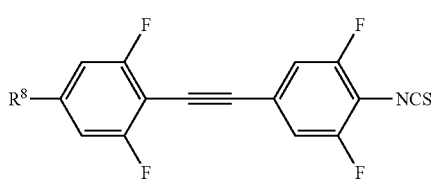

in which

R[8] has the meaning indicated above and preferably denotes $C_nH_{2n+1}$ or $CH_2=CH-(CH_2)_z$, and n independently of one another, denote an integer in the range from 0 to 15, preferably in the range from 1 to 7 and particularly preferably 1 to 5, and z denotes 0, 1, 2, 3 or 4, preferably 0 or 2.

The compounds of formula VIII-2 are preferably selected from the group of the compounds of the formulae VIII-2a and VIII-2b:

VIII-2a
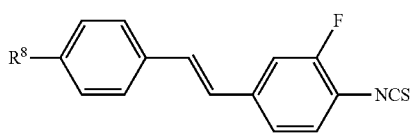

VIII-2b
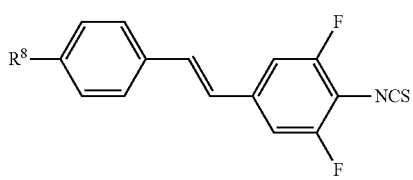

in which

R[8] has the meaning indicated above and preferably denotes $C_nH_{2n+1}$ or $CH_2=CH-(CH_2)_z$, n denotes an integer in the range from 0 to 15, preferably in the range from 1 to 7 and particularly preferably 1 to 5, and z denotes 0, 1, 2, 3 or 4, preferably 0 or 2.

The compounds of formula VIII-3 are preferably selected from the group of the compounds of the of formulae VIII-3a to VIII-3d:

VIII-3a
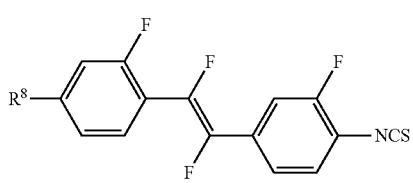

VIII-3B
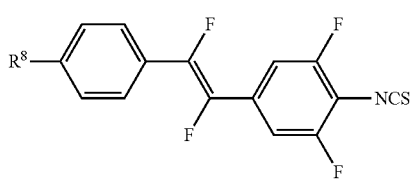

VIII-3c
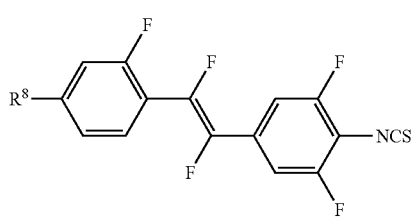

VIII-3d
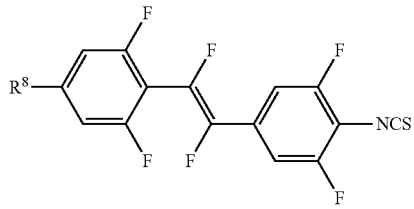

in which

R[8] has the meaning indicated above and preferably denotes $C_nH_{2n+1}$ or $CH_2=CH-(CH_2)_z$, n denotes an integer in the range from 0 to 15, preferably in the range from 1 to 7 and particularly preferably 1 to 5, and z denotes 0, 1, 2, 3 or 4, preferably 0 or 2.

The compounds of formula IX are preferably selected from the group of the compounds of the formulae IX-1 to XI-6, more preferably of the formulae selected from the group of the compounds of the formulae IX-1, IX-2, IX-3 and IX-4, and particularly preferably of formula IX-1:

IX-1
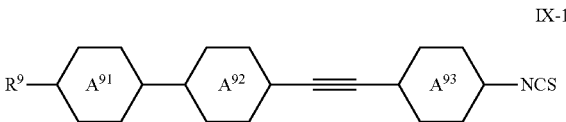

IX-2
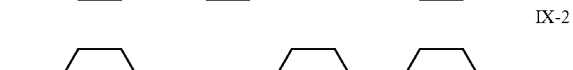

IX-3
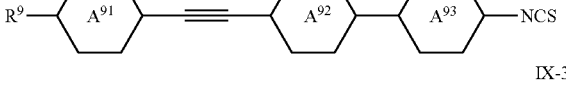

IX-4
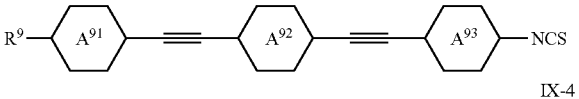

IX-5
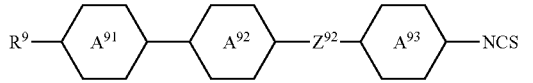

IX-6
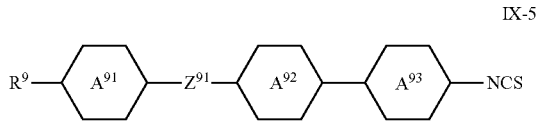

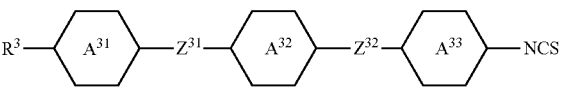

in which $Z^{91}$ and $Z^{92}$ independently of one another denote trans-CH=CH— or trans-CF=CF—, preferably trans-CH=CH—, and in formula IX-6 alternatively one of $Z^{31}$ and $Z^{32}$ may denote —C≡C— and the other parameters have the meaning given above under formula IX, and preferably $R^9$ denotes H, unfluorinated alkyl or alkoxy having 1 to 7 C atoms or unfluorinated alkenyl having 2 to 7 C atoms, and one of

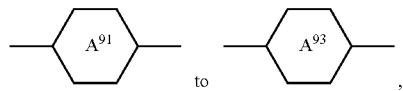

to preferably

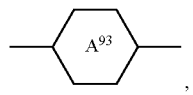

denotes

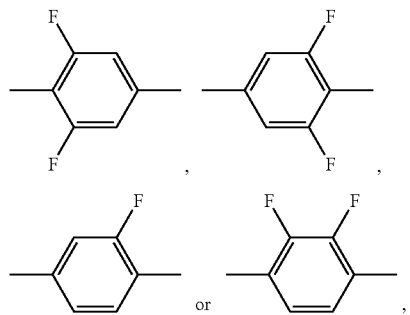

or preferably

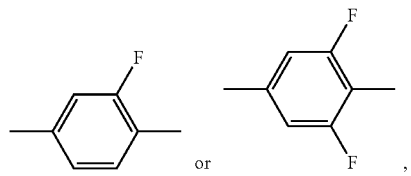

or and the others, independently of one another, denote

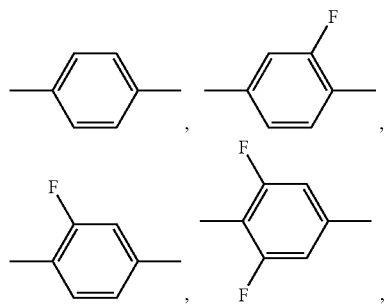

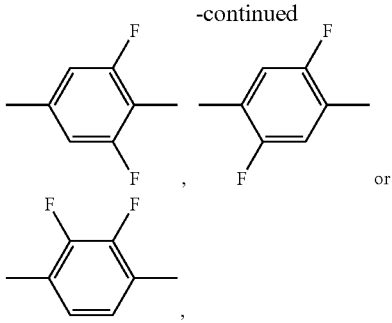

preferably

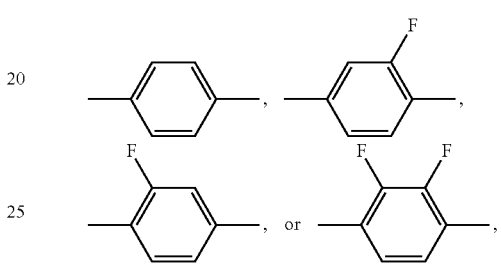

or more preferably

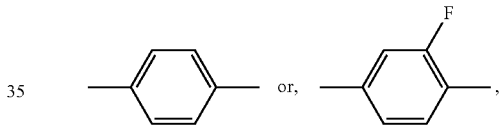

or, and preferably $R^9$ denotes $C_nH_{2n+1}$ or $CH_2$=CH—$(CH_2)_z$, n denotes an integer in the range from 0 to 15, preferably in the range from 1 to 7 and particularly preferably 1 to 5, and z denotes 0, 1, 2, 3 or 4, preferably 0 or 2.

The compounds of formula IX-1 are preferably selected from the group of the compounds of the formulae IX-1a to IX-1e, more preferably selected from the group of the compounds of the formulae IX-1a and IX-1b, particularly preferably of formula IX-1b:

IX-1a

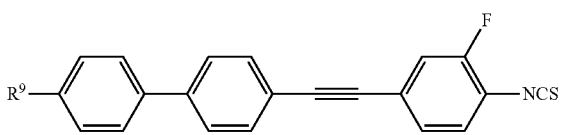

IX-1b

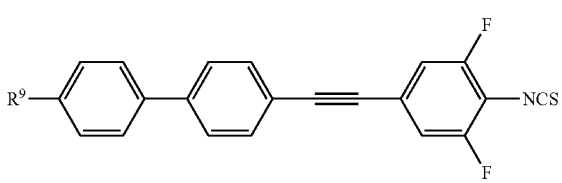

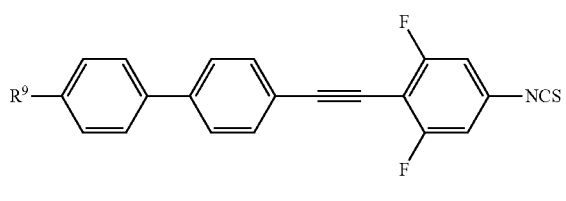

IX-1c

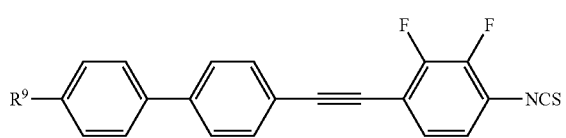

IX-1d

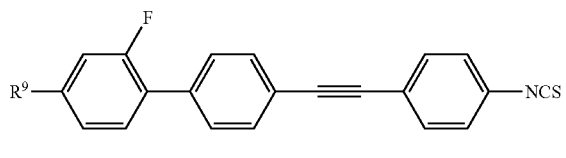

IX-1e in which
R⁹ has the meaning indicated above and preferably denotes $C_nH_{2n+1}$ or $CH_2=CH-(CH_2)_z$,
n denotes an integer in the range from 0 to 15, preferably in the range from 1 to 7 and particularly preferably 1 to 5, and
z denotes 0, 1, 2, 3 or 4, preferably 0 or 2.

The compounds of formula IX-2 are preferably compounds of formula IX-2a:

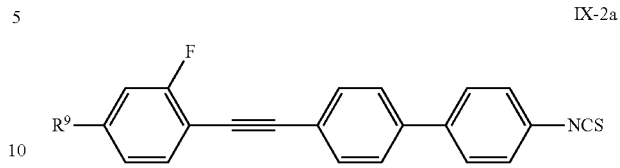

IX-2a in which
R⁹ has the meaning indicated above and preferably denotes $C_nH_{2n+1}$ or $CH_2=CH-(CH_2)_z$,
n denotes an integer in the range from 0 to 15, preferably in the range from 1 to 7 and particularly preferably 1 to 5, and
z denotes 0, 1, 2, 3 or 4, preferably 0 or 2.

The compounds of formula IX-5 are preferably selected from the compounds of formula IX-5a:

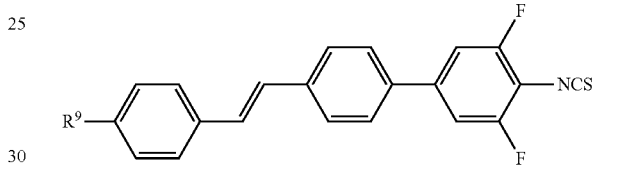

IX-5a

R⁹ has the meaning indicated above for formula IX-5 and preferably denotes $C_nH_{2n+1}$, in which
n denotes an integer in the range from 0 to 7, preferably in the range from 1 to 5.

Preferably, the media according to the invention, comprise a stabiliser selected from the group of compounds of the formulae ST-1 to ST-18.

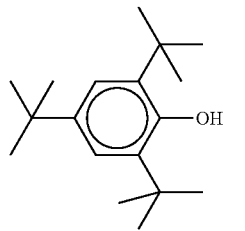

ST-1

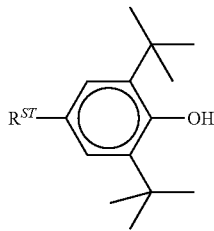

ST-2

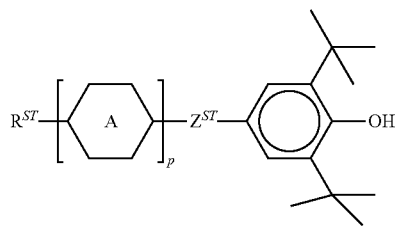

ST-3

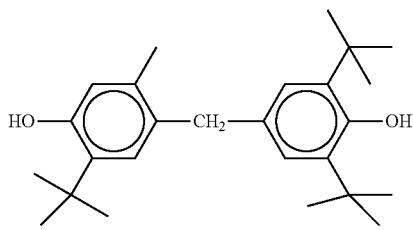

ST-4

-continued
ST-5
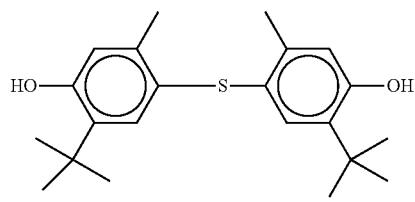
ST-6
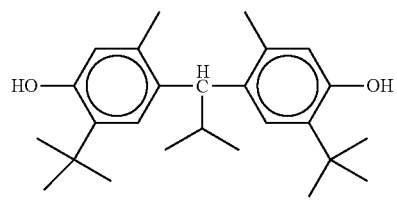
ST-7
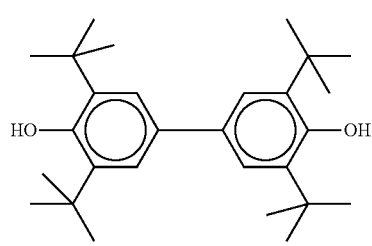
ST-8
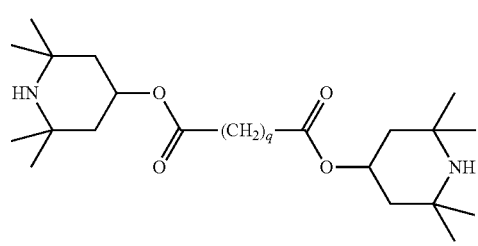
ST-9
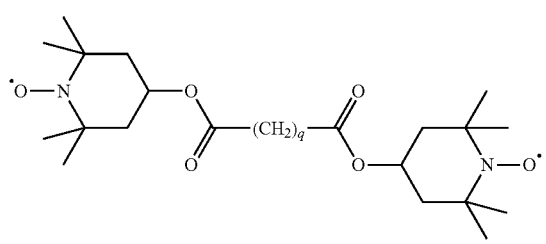
ST-10
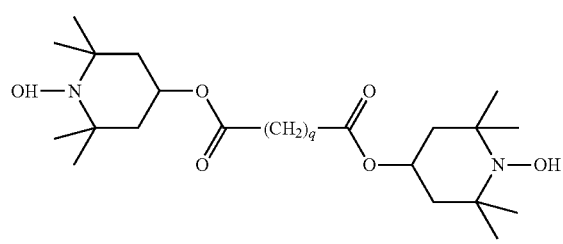
ST-11
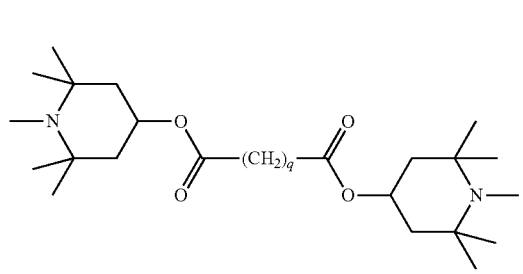
ST-12
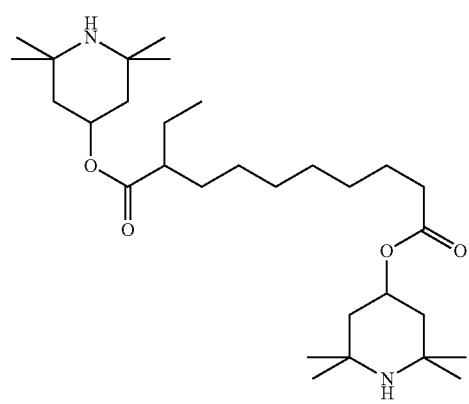
ST-13
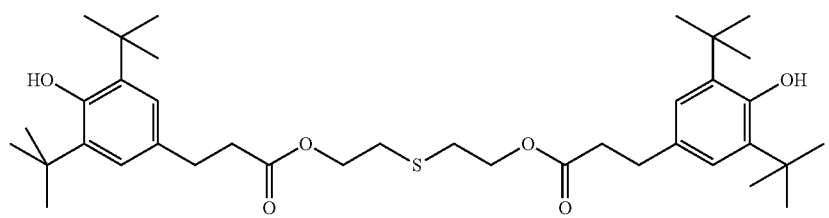

-continued

ST-14
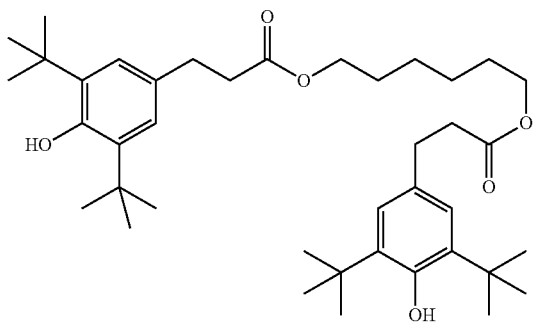

ST-15
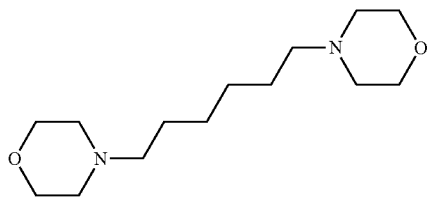

ST-16
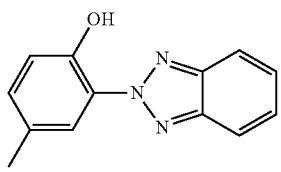

ST-17
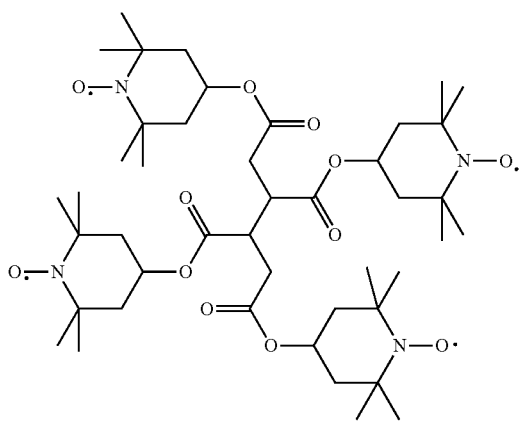

ST-18
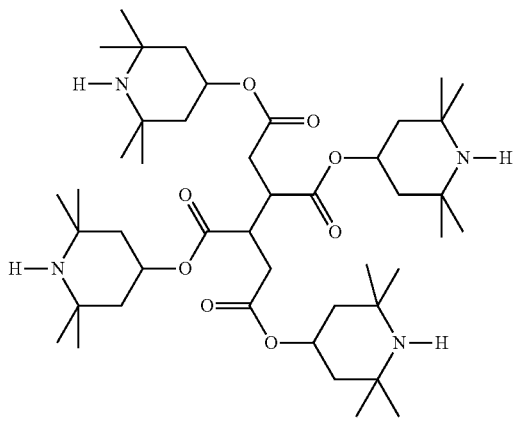

in which $R^{ST}$ denotes H, an alkyl or alkoxy radical having 1 to 15 C atoms, where, in addition, one or more $CH_2$ groups in these radicals may each be replaced, independently of one another, by —C≡C—, —$CF_2$O—, —O$CF_2$—, —CH=CH—,

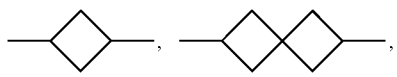

—O—, —CO—O—, —O—CO— in such a way that O atoms are not linked directly to one another, and in which, in addition, one or more H atoms may be replaced by halogen,

denotes

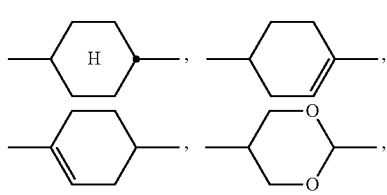

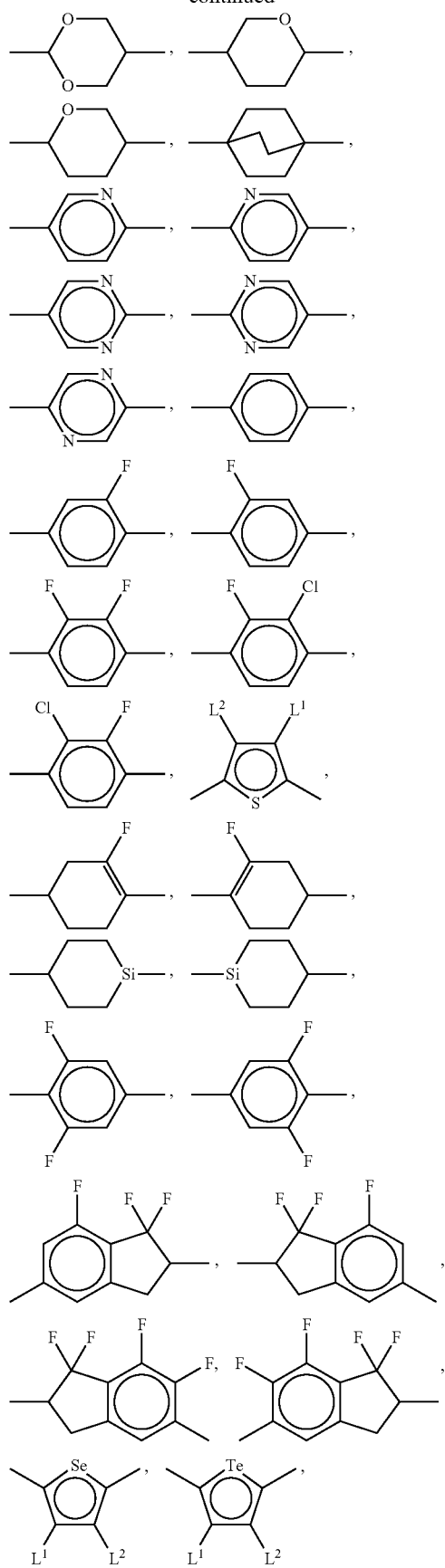
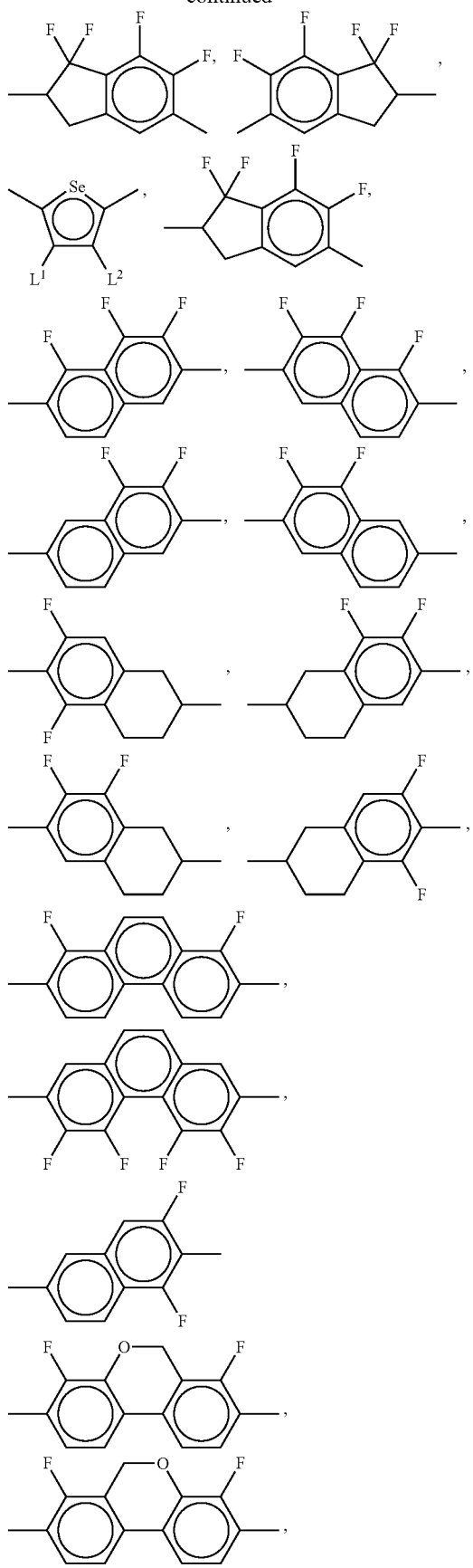

-continued

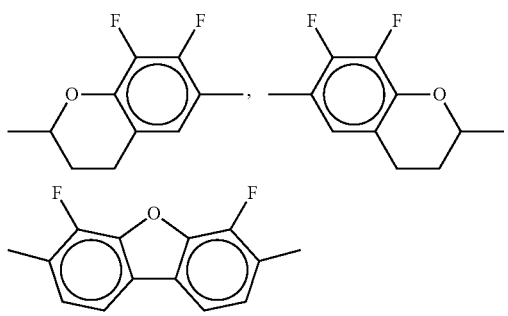

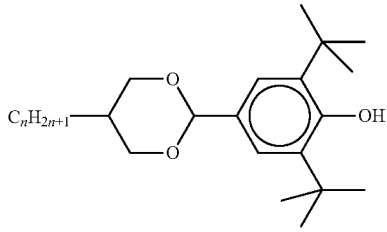

where n=1, 2, 3, 4, 5, 6 or 7, preferably n=3

$Z^{ST}$ each, independently of one another, denote —CO—O—, —O—CO—, —CF$_2$O—, —OCF$_2$—, —CH$_2$O—, —OCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond, $L^1$ and $L^2$ each, independently of one another, denote F, Cl, CF$_3$ or CHF$_2$, p denotes 1 or 2, q denotes 1, 2, 3, 4, 5, 6, 7, 8, 9 or 10.

Of the compounds of the formula ST, special preference is given to the compounds of the formulae St-1

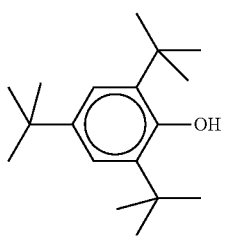

St-2a

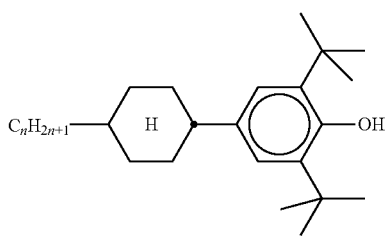

where n=1, 2, 3, 4, 5, 6 or 7, preferably n=1 or 7

ST-3a

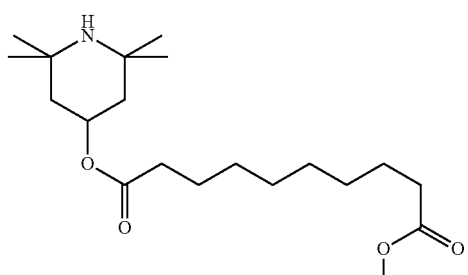

ST-3b

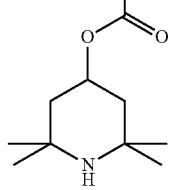

where n=1, 2, 3, 4, 5, 6 or 7, preferably n=3

ST-8-1

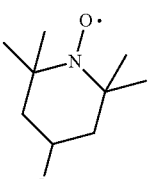

ST-9-1

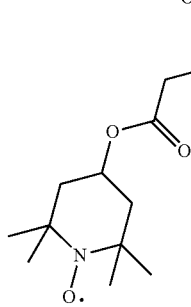

ST-12

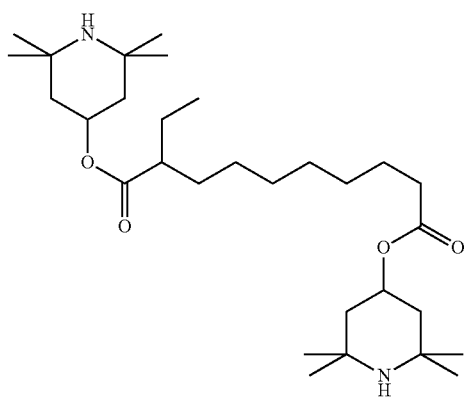

ST-16
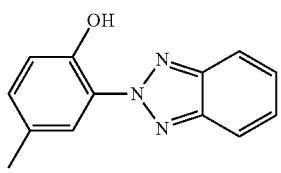
ST-17
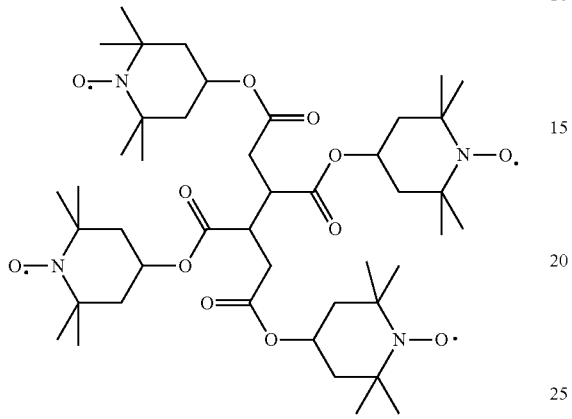
ST-18
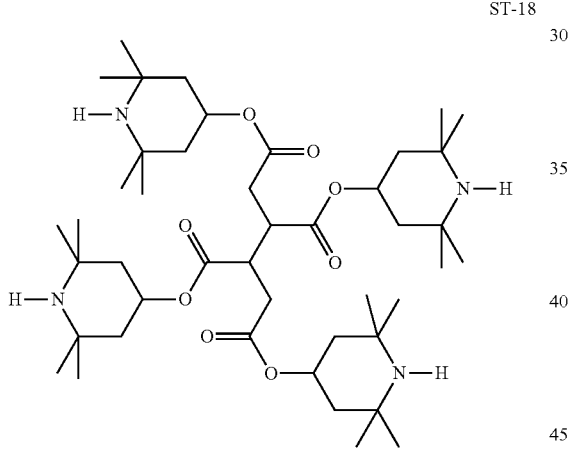
In the compounds of the formulae ST-3a and ST-3b, n preferably denotes 3. In the compounds of the formula ST-2a, n preferably denotes 7.
Very particularly preferred mixtures according to the invention comprise one or more stabilisers from the group of the compounds of the formulae ST-2a-1, ST-3a-1, ST-3b-1, ST-8-1, ST-9-1 and ST-12:
ST-2a-1
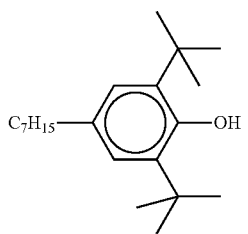
ST-3a-1
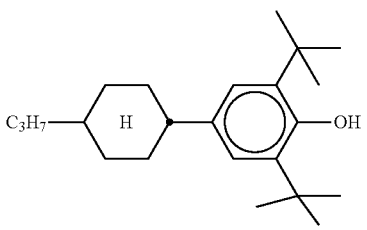
ST-3b-1
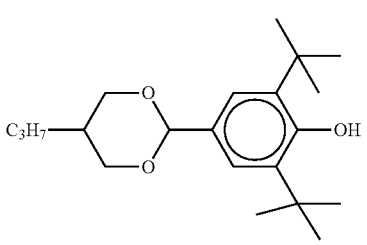
ST-8-1
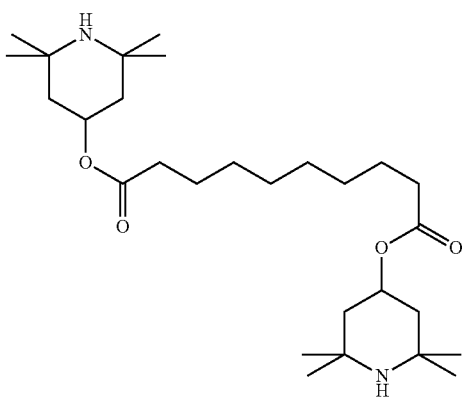
ST-9-1
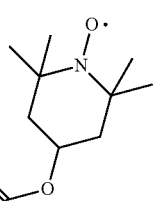
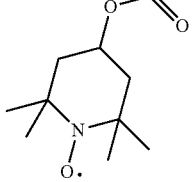

ST-12

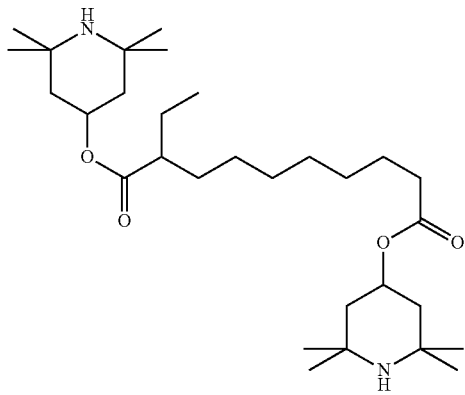

The compounds of the formulae ST-1 to ST-18 are preferably each present in the liquid-crystal mixtures according to the invention in amounts of 0.005-0.5%, based on the mixture.

If the mixtures according to the invention comprise two or more compounds from the group of the compounds of the formulae ST-1 to ST-18, the concentration correspondingly increases to 0.01-1% in the case of two compounds, based on the mixtures.

However, the total proportion of the compounds of the formulae ST-1 to ST-18, based on the mixture according to the invention, should not exceed 2%.

Other mesogenic compounds which are not explicitly mentioned above can optionally and advantageously also be used in the media in accordance with the present invention. Such compounds are known to the person skilled in the art.

In a preferred embodiment of the present invention, the liquid-crystal medium comprises one or more compounds of the formulae I-1 and II-3.

The liquid-crystal media in accordance with the present invention preferably have a clearing point of 90° C. or more, more preferably 95° C. or more, particularly preferably 100° C. or more.

The nematic phase of the media according to the invention preferably extends down to a lower temperature of 0° C. or less, more preferably down to −10° C. or less, even more preferably down to −20° C. or less and, most preferably down to −30° C. or less. At the same time, it preferably extends up to an upper temperature of to 90° C. or more, preferably up to 95° C. or more, more preferably up to 100° C. or more and, in particular, up to 110° C. or more.

Preferably, the dielectric anisotropy (Δε) of the liquid-crystal medium in accordance with the invention, at 1 kHz and 20° C., is in the range of from 3 to 20, preferably from 5 to 15 and particularly preferably from 6 to 12.

The Δn of the liquid-crystal media in accordance with the present invention, at 589.3 nm (Na$^D$) and 20° C., is preferably 0.200 or more, more preferably 0.240 or more.

The Δn of the liquid-crystal media in accordance with the present invention, at 589.3 nm (Na$^D$) and 20° C., is preferably in the range of from 0.200 to 0.400, more preferably from 0.230 to 0.300 and particularly preferably from 0.240 to 0.280.

Preferably, the liquid crystal media according to the invention comprise:
one or more compounds of formula I in a total concentration in the range of from 20% to 80%, preferably from 30% to 70%, particularly preferably from 40% to 60%;
one or more compounds of formula I-1 in a total concentration in the range of from 5% to 25%, preferably from 10% to 20%, particularly preferably from 12% to 18%;
one or more compounds of formula I-2 in a total concentration in the range of from 1% to 10%, preferably from 2% to 15%, particularly preferably from 3% to 7%;
one or more compounds of formula I-3 in a total concentration in the range of from 15% to 60%, preferably from 20% to 50%, particularly preferably from 25% to 45%;
one or more compounds of formula I in a total concentration of 40% or more, preferably of 44% or more, particularly preferably of 55% or more;
one or more compounds of formula I-1 and I-2 and I-3;
one or more compounds of formula III-3 in a total concentration in the range of from 1% to 10%, preferably from 2% to 8%;
one or more compounds of formula VI in a total concentration in the range of from 1% to 10%, preferably from 2% to 7%;
one or more compounds of formula VI in a total concentration of 20% or less, preferably 10% or less;
one or more compounds of formula II, preferably IIZ, in a total concentration in the range of from 5% to 50%, preferably 10% to 40%;
one or more compounds of formula II, preferably IIZ, and one or more compounds of formula VI in a total concentration in the range of from 10% to 30%, preferably 12% to 20%.

The acronyms used above are created according to tables A to C and are explained in table D.

Herein, the expression dielectrically positive describes compounds or components where Δε>3.0, dielectrically neutral describes those where −1.5≤Δε≤3.0 and dielectrically negative describes those where Δε<−1.5. Δε is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

The following definitions apply here.

$$\Delta\varepsilon \equiv (\varepsilon_\| - \varepsilon_\bot) \text{ and}$$

$$\varepsilon_{average} \equiv (\varepsilon_\| + 2\varepsilon_\bot)/3.$$

The host mixture used for dielectrically positive compounds is mixture ZLI-4792 and that used for dielectrically neutral and dielectrically negative compounds is mixture ZLI-3086, both from Merck KGaA, Germany. The absolute values of the dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such. All others are treated like compounds.

Herein, the expression "threshold voltage" refers to the optical threshold and is quoted for 10% relative contrast ($V_{10}$), "mid-grey voltage" is the voltage for 50% relative contrast ($V_{50}$) and the expression "saturation voltage" refers to the optical saturation and is quoted for 90% relative contrast ($V_{90}$), in all cases unless expressly stated otherwise. All characteristic voltages are determined for perpendicular observation. The capacitive threshold voltage ($V_0$), also called the Freedericks threshold ($V_{Fr}$), is only used if expressly mentioned.

Herein, the following conditions and definitions apply, unless expressly stated otherwise. All concentrations are quoted in percent by weight and relate to the respective mixture as a whole, all temperatures are quoted in degrees Celsius and all temperature differences are quoted in differential degrees. All physical properties are determined in accordance with "Merck liquid Crystals, Physical Properties of liquid Crystals", Status November 1997, Merck KGaA, Germany, and are quoted for a temperature of 20° C., unless expressly stated otherwise. The optical anisotropy (Δn) is determined at a wavelength of 589.3 nm. The dielectric anisotropy (Δε) is determined at a frequency of 1 kHz. The threshold voltages, as well as all other electro-optical properties, are determined using test cells produced at Merck KGaA, Germany. The test cells for the determination of Δε have a cell thickness of approximately 20 µm. The electrode is a circular ITO electrode having an area of 1.13 cm² and a guard ring. The orientation layers are SE-1211 from Nissan Chemicals, Japan, for homeotropic orientation ($\varepsilon\|$) and polyimide AL-1054 from Japan Synthetic Rubber, Japan, for homogeneous orientation ($\varepsilon_\perp$). The capacitances are determined using a Solatron 1260 frequency response analyser using a sine wave with a voltage of 0.3 $V_{rms}$.

The light used in the electro-optical measurements is white light. A set-up using a commercially available DMS instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast, respectively.

Herein, the term "compounds" does mean both one compound and a plurality of compounds, unless expressly stated otherwise.

The liquid-crystal media according to the invention preferably have nematic phases of in each case at least from −20° C. to 80° C., preferably from −30° C. to 100° C. and very particularly preferably from −40° C. to 130° C. The expression have a nematic phase here means on the one hand that no smectic phase and no crystallisation are observed at low temperatures at the corresponding temperature and on the other hand that no clearing occurs on heating from the nematic phase. The investigation at low temperatures is carried out in a flow viscometer at the corresponding temperature and checked by storage in test cells having a layer thickness of 5 µm for at least 100 hours. At high temperatures, the clearing point is measured in capillaries by conventional methods.

The clearing point (T(N,I)) of the liquid crystalline media preferably is 90° C. or more, more preferably 95° C. or more and particularly preferably 100° C. or more.

The liquid-crystal media according to the invention are also characterised by suitable rotational viscosities ($\gamma_1$). The rotational viscosities are preferably 350 mPa·s or less, more preferably 300 mPa·s or less, even more preferably 280 mPa·s or less and most preferably 250 mPa·s or less. Preferably the rotational viscosities of the media are as low as possible. However, a possible practical lower limit could be 100 mPa·s or more or even 150 mPa·s or more.

The term "alkyl" preferably encompasses straight-chain and branched alkyl groups, as well as cycloalkyl groups, each having 1 to 15 carbon atoms, in particular the straight-chain groups methyl, ethyl, propyl, butyl, pentyl, hexyl and heptyl, as well as cyclopropyl and cyclohexyl. Groups having 2 to 10 carbon atoms are generally preferred.

The term "alkenyl" preferably encompasses straight-chain and branched alkenyl groups having 2 to 15 carbon atoms, in particular the straight-chain groups. Particularly preferred alkenyl groups are $C_2$- to $C_7$-1E-alkenyl, $C_4$- to $C_7$-3E-alkenyl, $C_5$- to $C_7$-4-alkenyl, $C_6$- to $C_7$-5-alkenyl and $C_7$-6-alkenyl, in particular $C_2$- to $C_7$-1E-alkenyl, $C_4$- to $C_7$-3E-alkenyl and $C_5$- to $C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably encompasses straight-chain groups having a terminal fluorine, i.e. fluoromethyl, 2-fluoroethyl, 3-fluoropropyl, 4-fluoro-butyl, 5-fluoropentyl, 6-fluorohexyl and 7-fluoroheptyl. However, other positions of the fluorine are not excluded.

The term "oxaalkyl" or "alkoxyalkyl" preferably encompasses straight-chain radicals of the formula $C_nH_{2n+1}$—O—$(CH_2)_m$, in which n and m each, independently of one another, denote an integer from 1 to 10. Preferably, n here is 1 and m is 1 to 6.

Compounds containing a vinyl end group and compounds containing a methyl end group have low rotational viscosity.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media according to the invention.

The liquid-crystal media according to the invention consist of a plurality of compounds, preferably 3 to 30, more preferably 4 to 20 and very preferably 4 to 15 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations also referred to as acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, having n, m and l C atoms respectively, where n, m and l, independently of one another, denote an integer from 1 to 9, preferably 1 to 7, or from 2 to 9, preferably 2 to 7, respectively. $C_oH_{2o+1}$ denotes straight-chain alkyl having 1 to 7, preferably 1 to 4, C atoms, or branched alkyl having 1 to 7, preferably 1 to 4, C atoms.

Table A lists the codes used for the ring elements of the core structures of the compounds, while Table C shows the linking groups. Table C gives the meanings of the codes for the left-hand or right-hand end groups. Table D shows illustrative structures of compounds with their respective abbreviations.

TABLE A

| Ring elements | |
|---|---|
| C |  |
| P |  |
| D | 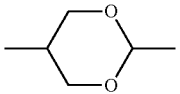 |
| DI | 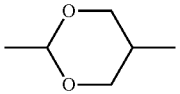 |
| A | 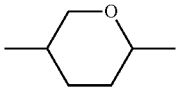 |
| AI | 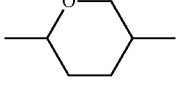 |
| G | 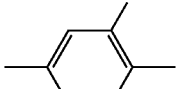 |
| GI | 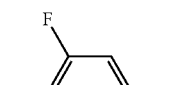 |
| U | 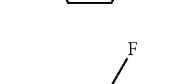 |

TABLE A-continued

| Ring elements | |
|---|---|
| UI | 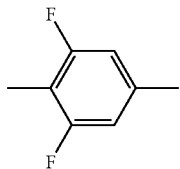 |
| Y | 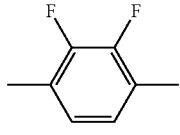 |
| M | 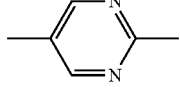 |
| MI | 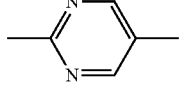 |
| N | 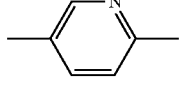 |
| NI | 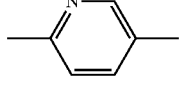 |
| fN | 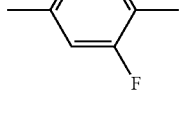 |
| fNI | 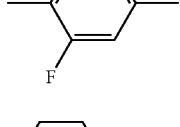 |
| dH | 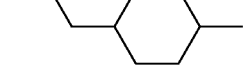 |
| N(2, 6) | 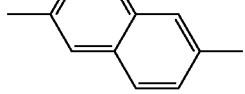 |
| K |  |

TABLE A-continued

Ring elements

| | |
|---|---|
| KI | 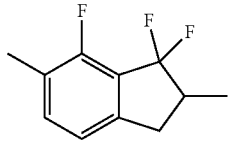 |
| L |  |
| LI | 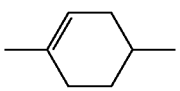 |
| F | 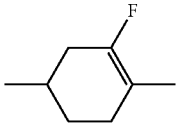 |
| FI | 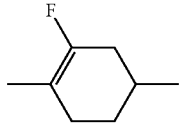 |

TABLE B

Linking groups

| | | | |
|---|---|---|---|
| E | —CH$_2$CH$_2$— | Z | —CO—O— |
| V | —CH=CH— | ZI | —O—CO— |
| X | —CF=CH— | O | —CH$_2$—O— |
| XI | —CH=CF— | OI | —O—CH$_2$— |
| B | —CF=CF— | Q | —CF$_2$—O— |
| T | —C≡C— | QI | —O—CF$_2$— |
| W | —CF$_2$CF$_2$— | | |

TABLE C

End groups

| Left-hand side | | Right-hand side | |
|---|---|---|---|
| \multicolumn{4}{c}{Use alone} | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| —V— | CH$_2$=CH— | —V | —CH=CH$_2$ |
| -nV- | C$_n$H$_{2n+1}$—CH=CH— | -nV | —C$_n$H$_{2n}$—CH=CH$_2$ |
| -Vn- | CH$_2$=CH—C$_n$H$_{2n+1}$— | -Vn | —CH=CH—C$_n$H$_{2n+1}$ |
| -nVm- | C$_n$H$_{2n+1}$—CH=CH—C$_m$H$_{2m}$— | -nVm | —C$_n$H$_{2n}$—CH=CH—C$_m$H$_{2m+1}$ |
| —N— | N≡C— | —N | —C≡N |
| —S— | S=C=N— | —S | —N=C=S |
| —F— | F— | —F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$=CH—O— | -OXF | —O—CH=CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| \multicolumn{4}{c}{Use together with others} | | | |
| -...A...- | —C≡C— | -...A... | —C≡C— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m each denote integers, and the three dots " . . . " are place-holders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures
The illustrative structures show compounds which are particularly preferably employed.

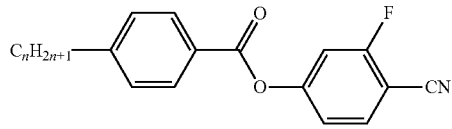

PZG-n-N

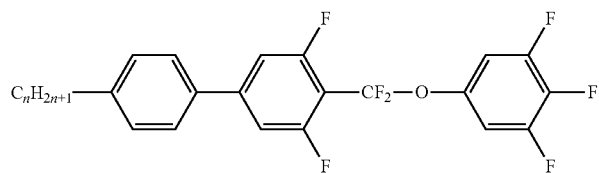

PUQU-n-F

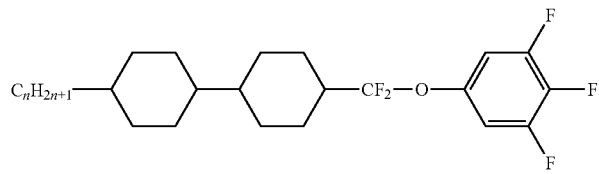

CCQU-n-F

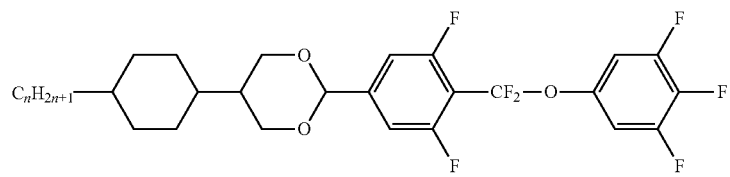

CDUQU-n-F

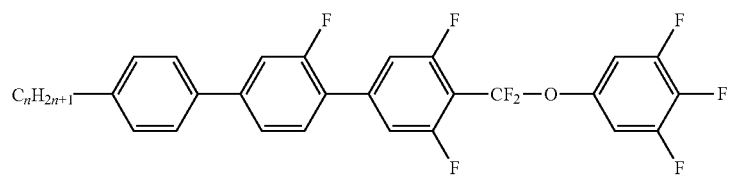

PGUQU-n-F

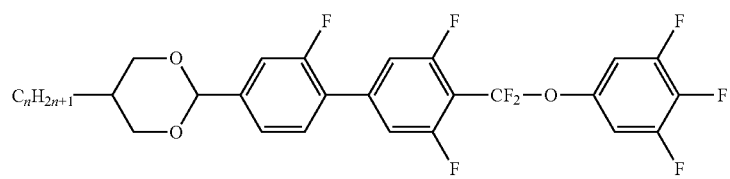

DGUQU-n-F

TABLE D-continued
Illustrative structures
The illustrative structures show compounds which are particularly preferably employed.
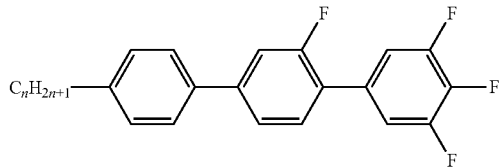
PGU-n-F
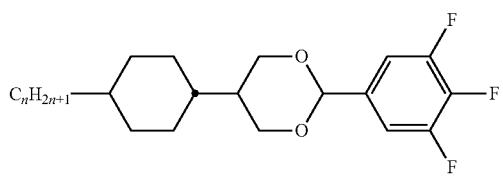
CDU-n-F
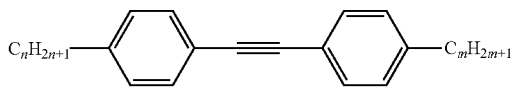
PTP-n-m
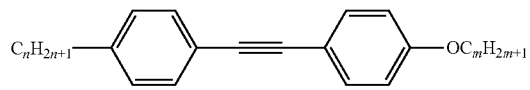
PTP-n-Om
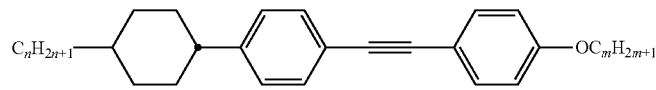
CPTP-n-Om
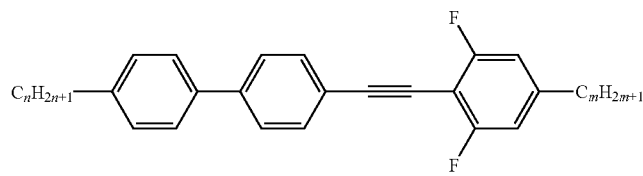
PPTUI-n-m
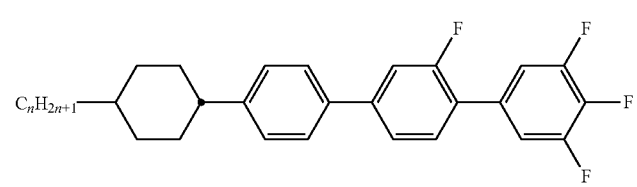
CPGU-n-F
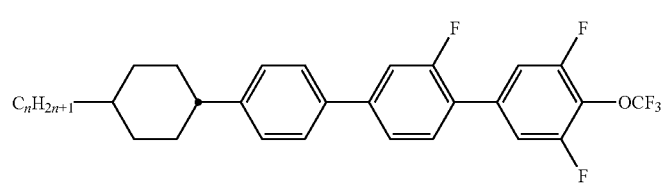
CPGU-n-OT TABLE D-continued
Illustrative structures
The illustrative structures show compounds which are particularly preferably employed.
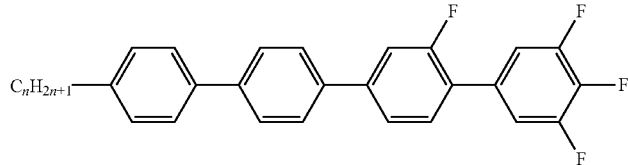
PGP-n-kVI
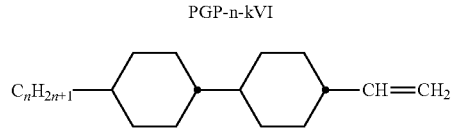
CC-n-V
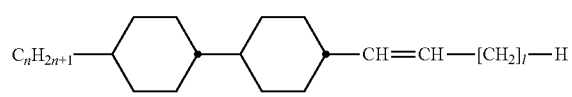
CC-n-Vl
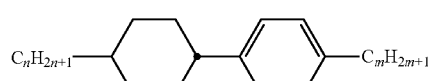
CP-n-m
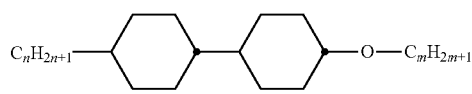
CC-n-Om
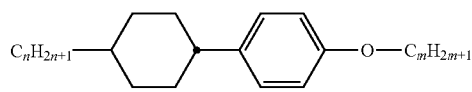
CP-n-Om
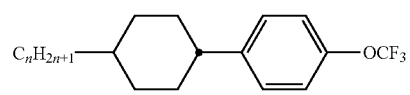
CP-n-OT
CCP-n-m
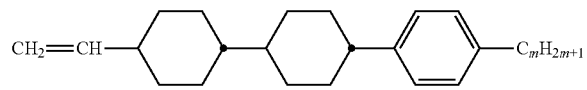
CCP-V-m
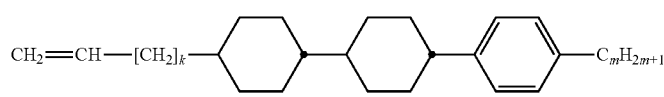
CCP-Vk-m TABLE D-continued
Illustrative structures
The illustrative structures show compounds which are particularly preferably employed.
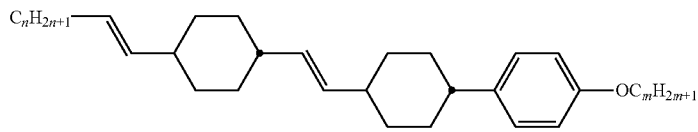
CVCP-nV-Om
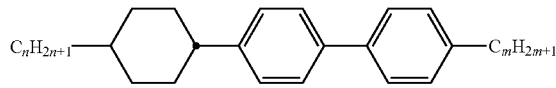
CPP-n-m
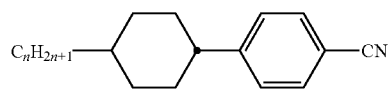
CP-n-N
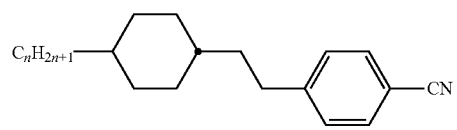
CEP-n-N
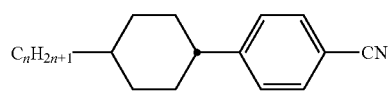
CP-nV-N
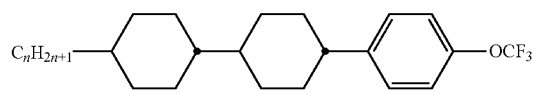
CCP-n-OT
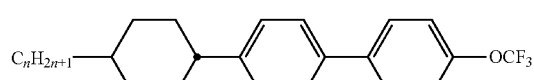
CPP-n-OT
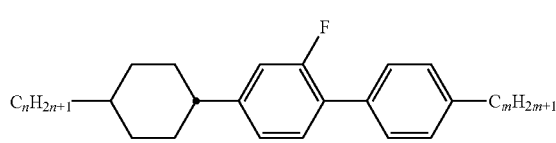
CGP-n-m
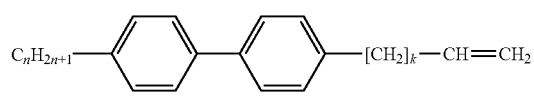
PP-n-kV
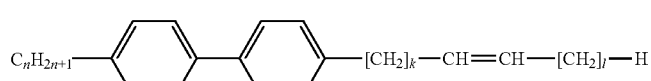
PP-n-kVl TABLE D-continued
Illustrative structures
The illustrative structures show compounds which are particularly preferably employed.
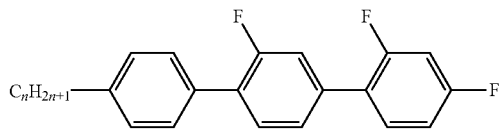
PGIGI-n-F
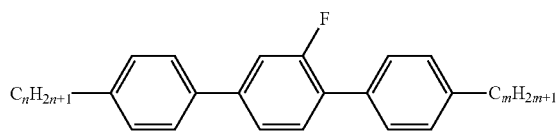
PGP-n-m
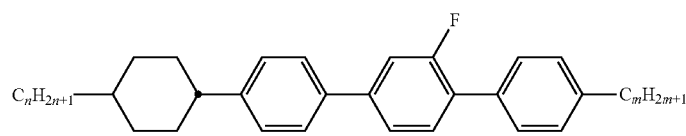
CPGP-n-m
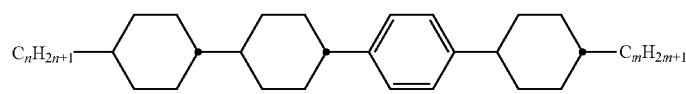
CCPC-n-m
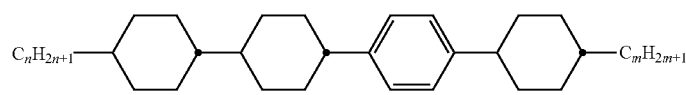
CCEP-n-m
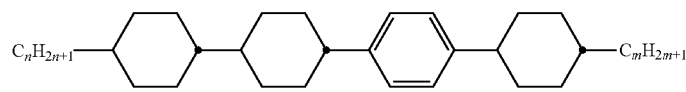
CGPC-n-m
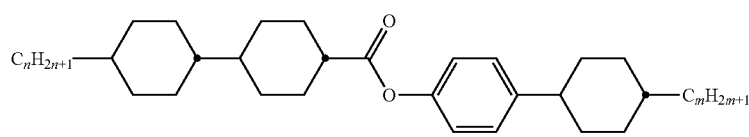
CCZPC-n-m Herein n ∋ {1;2;3;4;5;6;7}, m ∋ {1;2;3;4;5;6;7}, and k ∋ {1;2;3;4}, preferably 2 or 4, most preferably 2, and l ∋ {1;2;3}, preferably 1.
The following table, Table E, shows illustrative compounds which can be used as stabiliser in the liquid-crystal media in accordance with the present invention. The total concentration of these and similar compounds in the media is preferably 5% or less.
TABLE E
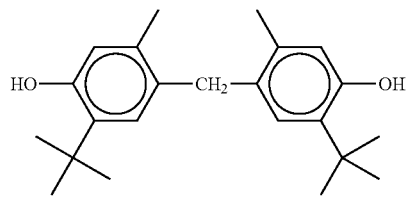
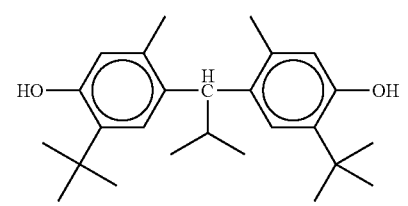
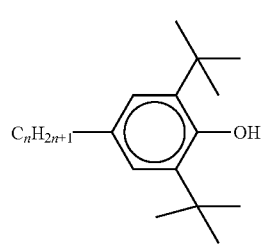
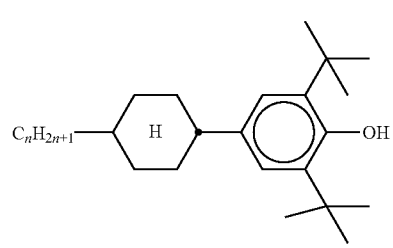
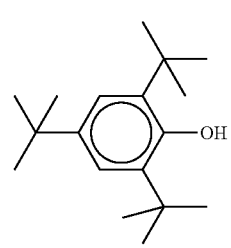
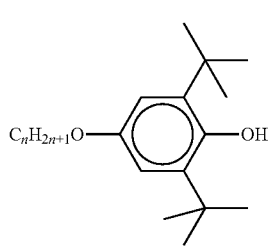
TABLE E-continued
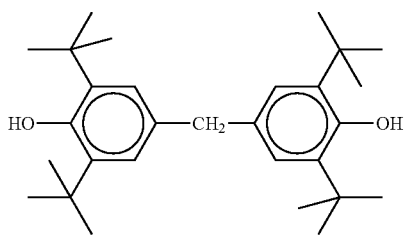
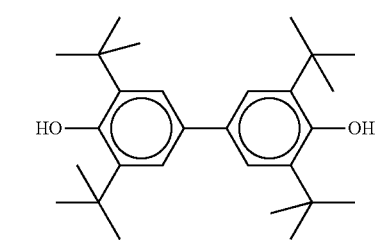
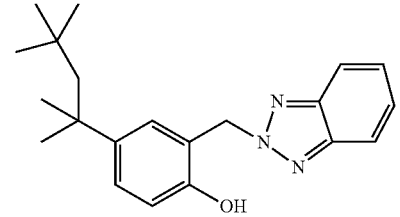 [SMILES: CC(C)(C)CC(C)(C)c1ccc(O)c(Cn2nc3ccccc3n2)c1]
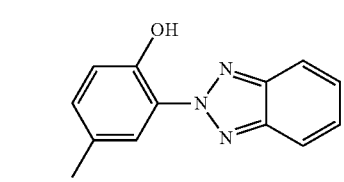 [SMILES: Cc1ccc(O)c(-n2nc3ccccc3n2)c1]
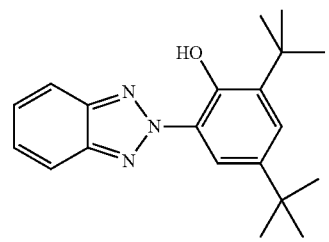 [SMILES: CC(C)(C)c1cc(-n2nc3ccccc3n2)c(O)c(C(C)(C)C)c1]
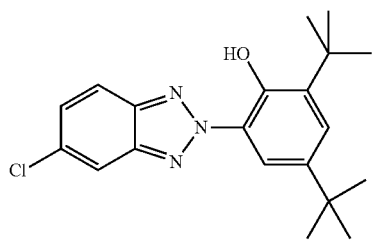 [SMILES: CC(C)(C)c1cc(-n2nc3ccc(Cl)cc3n2)c(O)c(C(C)(C)C)c1]

TABLE E-continued
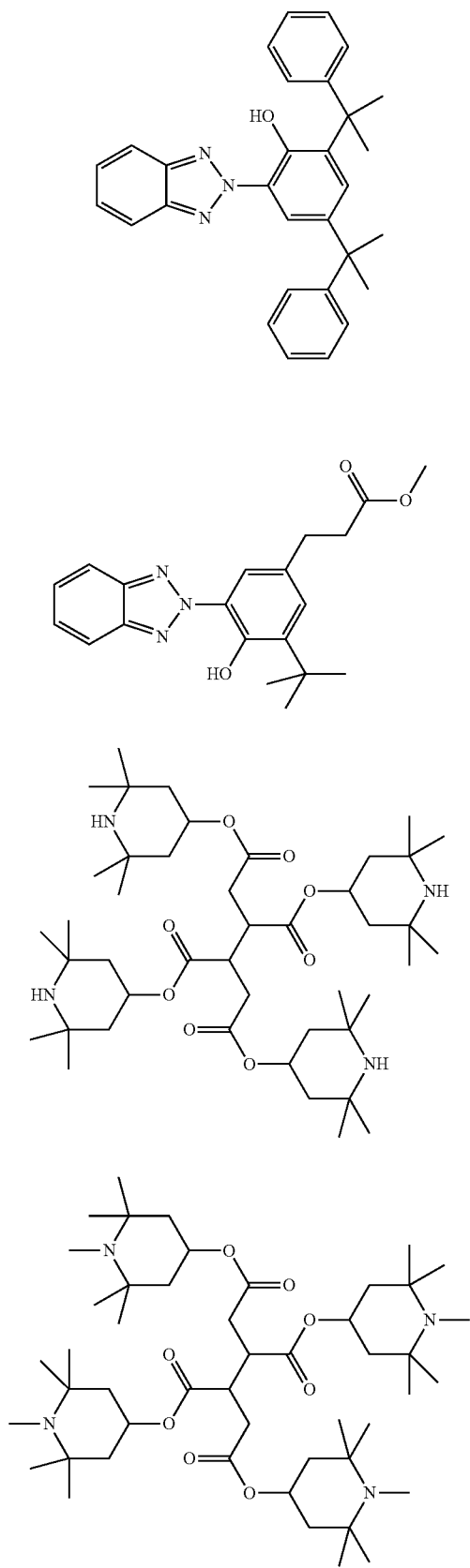
TABLE E-continued
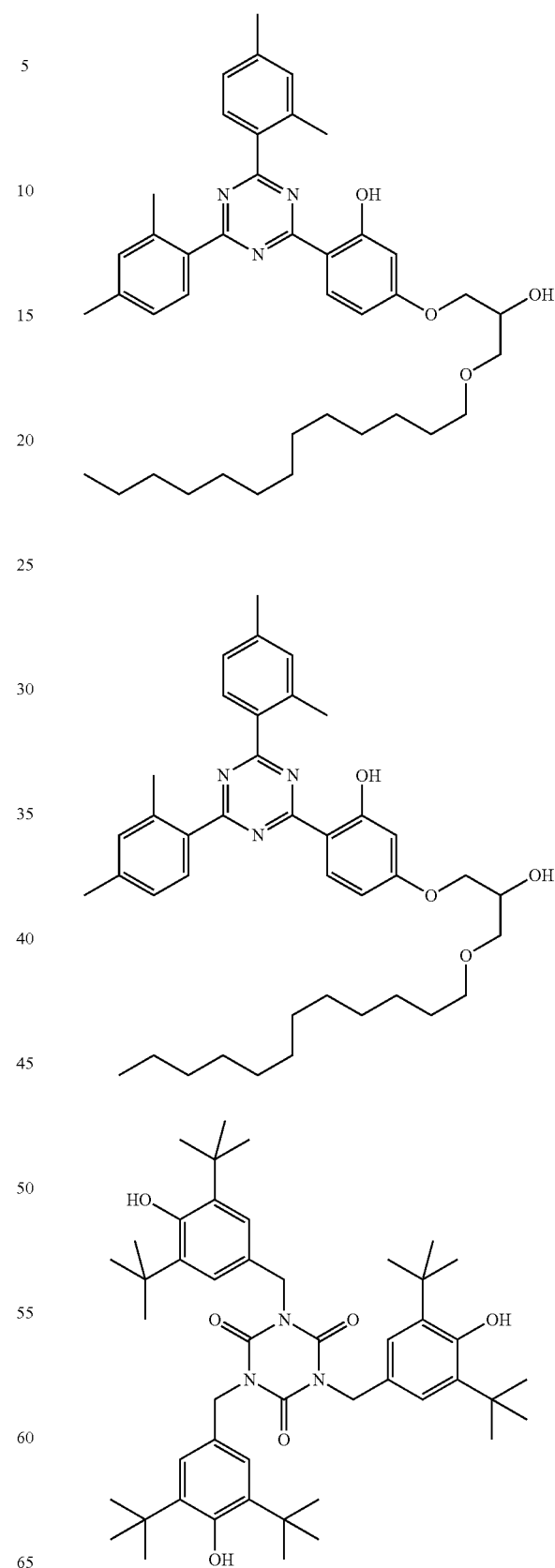

TABLE E-continued

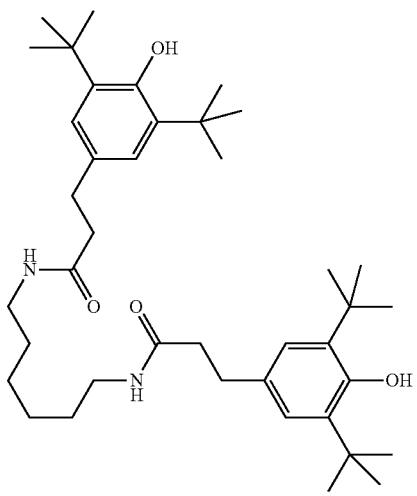 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]

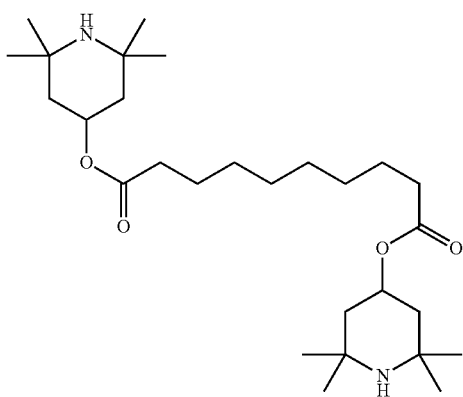

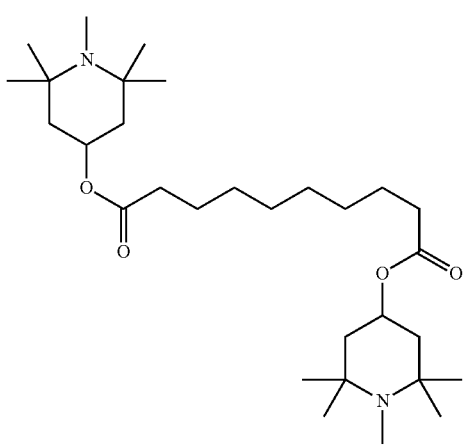

TABLE E-continued

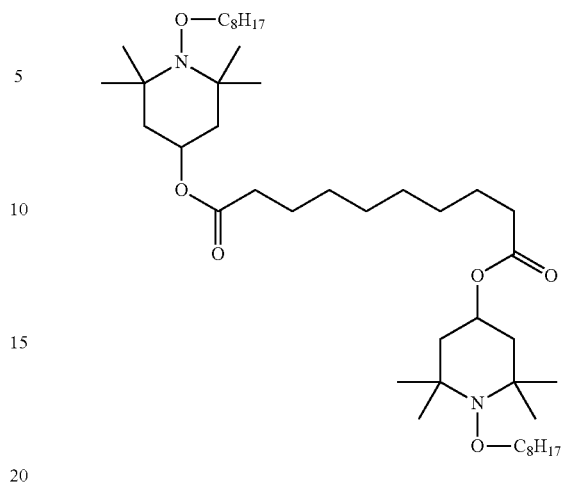

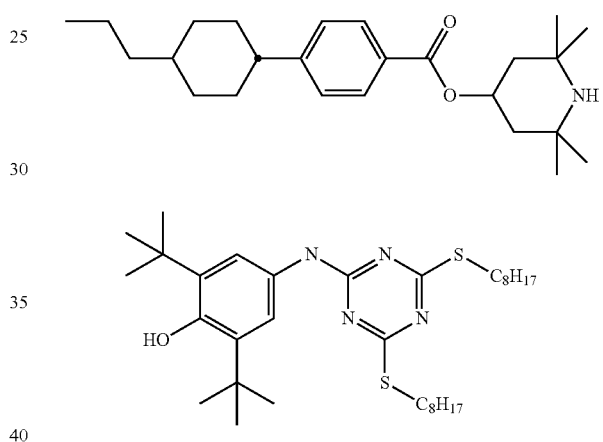

In a preferred embodiment of the present invention, the liquid-crystal media comprise one or more compounds selected from the group of the compounds from Table E.

The liquid-crystal media in accordance with the present invention preferably comprise two or more, preferably four or more, compounds selected from the group consisting of the compounds from the above tables.

The liquid-crystal media in accordance with the present invention preferably comprise seven or more, preferably eight or more, compounds, preferably compounds having three or more, preferably four or more, different formulae, selected from the group of the compounds from Table D.

EXAMPLES

The following examples illustrate the present invention without limiting it in any way. However, it becomes clear to the person skilled in the art from the physical properties what properties can be achieved and in what ranges they can be modified. In particular, the combination of the various properties which can preferably be achieved is thus well defined for the person skilled in the art.

The nematic liquid-crystal mixtures C1, C2, and N1 to N12 are prepared as follows:

Comparative Example C1

| | | | |
|---|---|---|---|
| CEP-3-N | 10.0% | $T_{(N,I)}$ [° C.]: | 74 |
| CP-3-N | 24.0% | $\Delta n$ (589.3 nm, 20° C.) | 0.1383 |
| CP-5-N | 5.0% | $n_e$ (589.3 nm, 20° C.) | 1.6376 |
| CP-3-O2 | 16.0% | $n_o$ (589.3 nm, 20° C.) | 1.4993 |
| CP-3-OT | 5.0% | $\Delta\varepsilon$ (1 kHz, 20° C.): | 7.5 |
| CCEP-3-1 | 6.0% | $\varepsilon_\parallel$ (1 kHz, 20° C.): | 11.4 |
| CCEP-3-2 | 5.0% | $\varepsilon_\perp$ (1 kHz, 20° C.): | 3.9 |
| CCEP-3-3 | 5.0% | $\gamma_1$ [mPa·s], (20° C.): | 119 |
| PTP-1-O2 | 6.0% | $K_1$ [pN], (20° C.): | 12.7 |
| PTP-2-O1 | 6.0% | $K_3$ [pN], (20° C.): | 17.8 |
| CPP-3-2 | 6.0% | $V_0$ [V], (20° C.): | 1.40 |
| CPP-5-2 | 6.0% | | |
| Σ | 100.0% | | |

Comparative Example C2

| | | | |
|---|---|---|---|
| PUQU-3-F | 15.0% | $T_{(N,I)}$ [° C.]: | 101 |
| PGUQU-3-F | 6.0% | $\Delta n$ (589.3 nm, 20° C.) | 0.1889 |
| CP-3-O2 | 18.0% | $n_e$ (589.3 nm, 20° C.) | 1.6969 |
| CVCP-1V-O1 | 4.0% | $n_o$ (589.3 nm, 20° C.) | 1.5081 |
| PP-1-2V1 | 6.0% | $\Delta\varepsilon$ (1 kHz, 20° C.): | 9.6 |
| PGU-2-F | 6.0% | $\varepsilon_\parallel$ (1 kHz, 20° C.): | 13.6 |
| PGU-3-F | 6.0% | $\varepsilon_\perp$ (1 kHz, 20° C.): | 4.0 |
| PGIGI-3-F | 12.0% | $\gamma_1$ [mPa·s], (20° C.): | 253 |
| PGP-2-3 | 7.0% | $K_1$ [pN], (20° C.): | 16.3 |
| CPGP-5-2 | 6.0% | $K_3$ [pN], (20° C.): | 17.9 |
| CPGP-5-3 | 6.0% | $V_0$ [V], (20° C.): | 1.38 |
| CGPC-3-3 | 4.0% | | |
| CGPC-5-3 | 4.0% | | |
| Σ | 100.0% | | |

Mixture Example N1

| | | | |
|---|---|---|---|
| PZG-2-N | 13.0% | $T_{(N,I)}$ [° C.]: | 114 |
| PZG-3-N | 7.0% | $\Delta n$ (589.3 nm, 20° C.) | 0.2563 |
| PZG-4-N | 9.0% | $n_e$ (589.3 nm, 20° C.) | 1.7657 |
| PZG-5-N | 8.0% | $n_o$ (589.3 nm, 20° C.) | 1.5094 |
| CP-3-O2 | 7.0% | $\Delta\varepsilon$ (1 kHz, 20° C.): | 10.6 |
| CC-5-V | 8.0% | $\varepsilon_\parallel$ (1 kHz, 20° C.): | 14.7 |
| PTP-1-O2 | 8.0% | $\varepsilon_\perp$ (1 kHz, 20° C.): | 4.1 |
| PTP-2-O1 | 8.0% | $\gamma_1$ [mPa·s], (20° C.): | 319 |
| PPTUI-3-2 | 13.0% | $K_1$ [pN], (20° C.): | 15.2 |
| PPTUI-3-4 | 15.0% | $K_3$ [pN], (20° C.): | 18.4 |
| CCZPC-3-3 | 3.0% | $V_0$ [V], (20° C.): | 1.27 |
| CCZPC-3-4 | 4.0% | | |
| Σ | 100.0% | | |

Mixture Example N2

| | | | |
|---|---|---|---|
| PZG-4-N | 10.5% | $T_{(N,I)}$ [° C.]: | 104 |
| CP-1V-N | 5.0% | $\Delta n$ (589.3 nm, 20° C.) | 0.2493 |
| CP-3-O1 | 16.5% | $n_e$ (589.3 nm, 20° C.) | 1.7652 |
| CCP-V-1 | 7.0% | $n_o$ (589.3 nm, 20° C.) | 1.5159 |
| PTP-1-O2 | 4.5% | $\Delta\varepsilon$ (1 kHz, 20° C.): | 7.1 |
| PTP-2-O1 | 4.5% | $\varepsilon_\parallel$ (1 kHz, 20° C.): | 11.0 |
| PTP-3-O1 | 4.5% | $\varepsilon_\perp$ (1 kHz, 20° C.): | 3.9 |
| CPTP-3-O1 | 5.0% | $\gamma_1$ [mPa·s], (20° C.): | 245 |
| PPTUI-3-2 | 20.0% | | |
| PPTUI-3-4 | 20.0% | | |
| CGPC-3-3 | 2.5% | | |
| Σ | 100.0% | | |

The media N3 to N12 are prepared from the medium N2 by addition of stabilisers selected from ST-16, ST-3a-1, ST-3b-1, and ST-8-1, in the amounts given in the table below.

| Mixture | c(ST-16) [%] | ST-3a-1 [ppm] | ST-3b-1 [ppm] | ST-8-1 [ppm] |
|---|---|---|---|---|
| N3 | 0.5 | - | - | - |
| N4 | 0.5 | 100 | - | - |
| N5 | - | 300 | - | - |
| N6 | - | 300 | - | 100 |
| N7 | - | 300 | - | 500 |
| N8 | - | 300 | - | 1000 |
| N9 | - | - | 300 | - |
| N10 | - | - | 300 | 100 |
| N11 | - | - | 300 | 500 |
| N12 | - | - | 300 | 1000 |

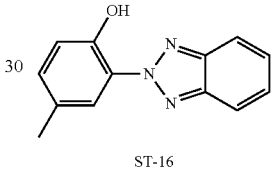

ST-16

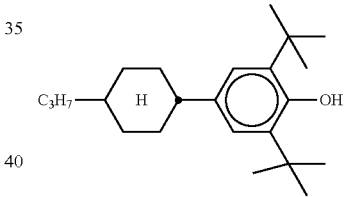

ST-3a-1

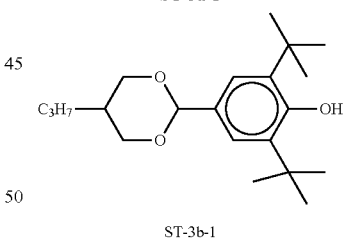

ST-3b-1

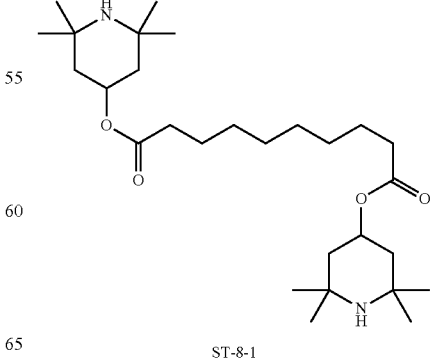

ST-8-1

A LC zoom lens equipped with one of the media N1 to N12 has a shorter shortest focal length and a lower driving voltage than a zoom lens equipped with the medium C1 or C2.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. From the description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding Chinese application No. CN 107125456, filed Jul. 24, 2018, are incorporated by reference herein.

The invention claimed is:

1. A liquid-crystal lens comprising an electrode on a substrate and a liquid-crystal medium, wherein the liquid-crystal medium comprises one or more compounds of formula I-1 present at a concentration of 12-18%, one or more compounds of formula I-2 present at a concentration of 3-7% and one or more compounds of formula I-3 present at a concentration of 25-45%,

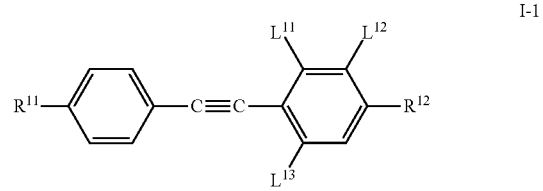

I-1

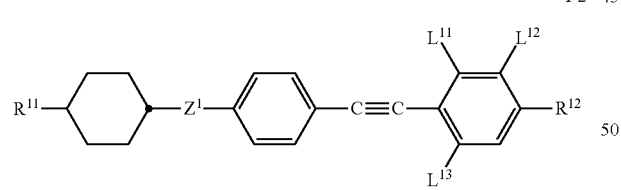

I-2

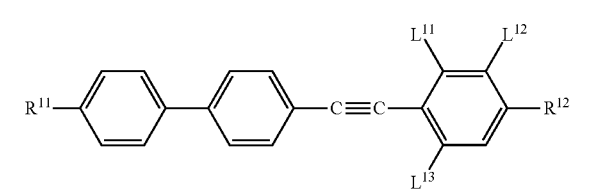

I-3 in which $R^{11}$ and $R^{12}$ identically or differently, denote H, alkyl or alkoxy having 1 to 12 C atoms, or alkenyl, alkenyloxy or alkoxyalkyl having 2 to 12 C atoms, in which one or more $CH_2$-groups may be replaced by

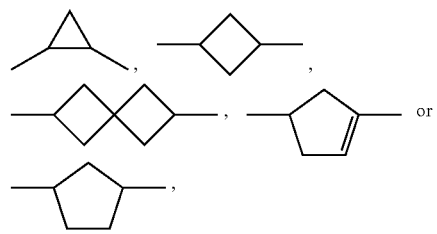

and in which one or more H atoms may be replaced by fluorine, $Z^1$ denotes —$CH_2CH_2$— or a single bond, and $L^{11}$, $L^{12}$, $L^{13}$ each, independently of one another, denote H or F;

and

10% to 30% by weight of one or more compounds of formula IIZ

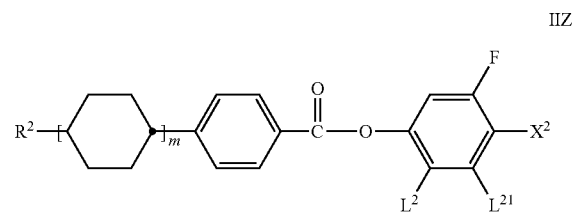

IIZ in which $R^2$ denotes H, alkyl or alkoxy having 1 to 12 C atoms, or alkenyl, alkenyloxy or alkoxyalkyl having 2 to 12 C atoms, in which one or more $CH_2$-groups may be replaced by

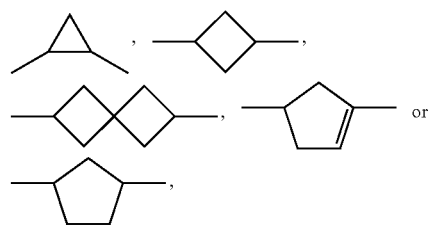

and in which one or more H atoms may be replaced by fluorine, $X^2$ denotes F, Cl, $CF_3$, $OCF_3$, CN or NCS, $L^{21}$ denotes H or F, $L^2$ denotes H or alkyl having 1 to 6 C atoms, and m is 0 or 1;

and one or more compounds of formula III

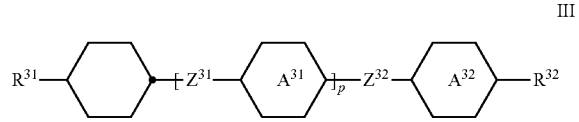

III in which $R^{31}$ and $R^{32}$ identically or differently, denote alkyl having 1 to 20 C atoms, which is straight chain or alkyl having 3 to 20 C atoms, which is branched, which is non-substituted, mono- or poly-substituted by F, Cl or CN, and in which one or more CH$_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that O and/or S atoms are not linked directly to one another,

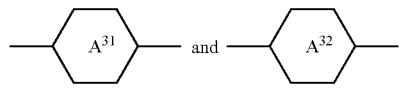

independently of each other, denote

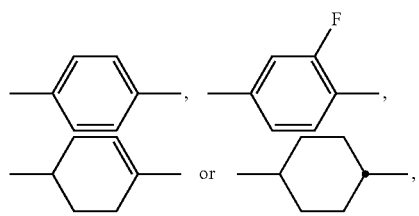

Z$^{31}$ and Z$^{32}$ on each occurrence, identically or differently, denote —CH$_2$CH$_2$—, —CF$_2$CF$_2$—, —CF$_2$CH$_2$—, —COO—, trans- —CH=CH—, trans- —CF=CF—, —CH$_2$O—, —CF$_2$O—, —C≡C— or a single bond, and p is 0, 1 or 2;

and

1% to 10% by weight of one or more compounds of formula VI

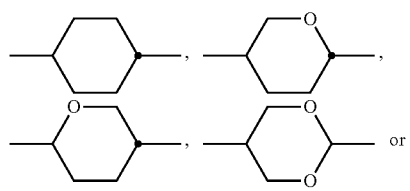

in which

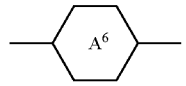

denotes

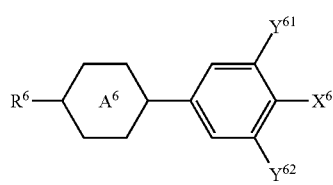

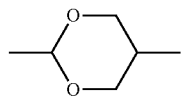

R$^6$ denotes H, alkyl or alkoxy having 1 to 12 C atoms, or alkenyl, alkenyloxy or alkoxyalkyl having 2 to 12 C atoms, in which one or more CH$_2$-groups may be replaced by

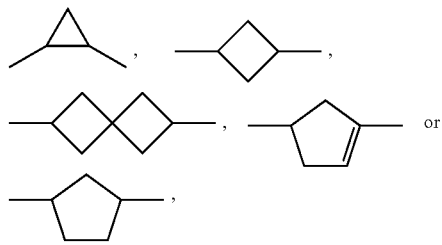

and in all of which one or more H atoms may be replaced by fluorine,

X$^6$ denotes CN, F, CF$_3$ or OCF$_3$ and

Y$^{61}$ and Y$^{62}$ identically or differently, denote H, Cl or F; and wherein the medium has a birefringence of 0.24 or more, and a dielectric anisotropy of 5 to 15.

2. The lens according to claim 1, wherein the proportion of the one or more compounds of formula III in the liquid-crystal medium is less than 30%.

3. The lens according to claim 1, wherein the medium comprises one or more compounds of formula III-3

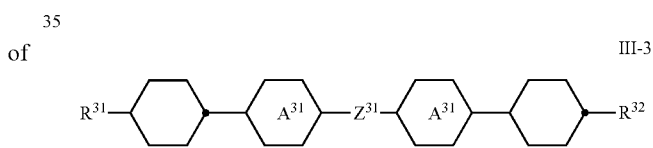

in which

R$^{31}$ and R$^{32}$ identically or differently, denote alkyl having 1 to 20 C atoms, which is straight chain or alkyl having 1 to 20 C atoms, which is branched, which is non-substituted, mono- or poly-substituted by F, Cl or CN, and in which one or more CH$_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that O and/or S atoms are not linked directly to one another,

each, independently of each other, denote

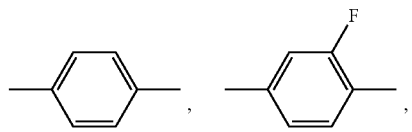

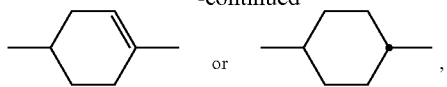

and $Z^{31}$ denotes —CH$_2$CH$_2$—, —CF$_2$CF$_2$—, —CF$_2$CH$_2$—, —COO—, trans-CH=CH—, trans-CF=CF—, —CH$_2$O—, —CF$_2$O—, —C≡C— or a single bond.

4. The lens according to claim 1, wherein the liquid-crystal medium has a clearing temperature of 100° C. or more.

5. The lens according to claim 1, wherein the electrode is patterned.

6. A liquid-crystal medium comprising one or more compounds of formula I-1, one or more compounds of formula I-2 and one or more compounds of formula I-3, wherein the compounds of formulae I-1, I-2 and I-3 are present collectively at 40% to 90,

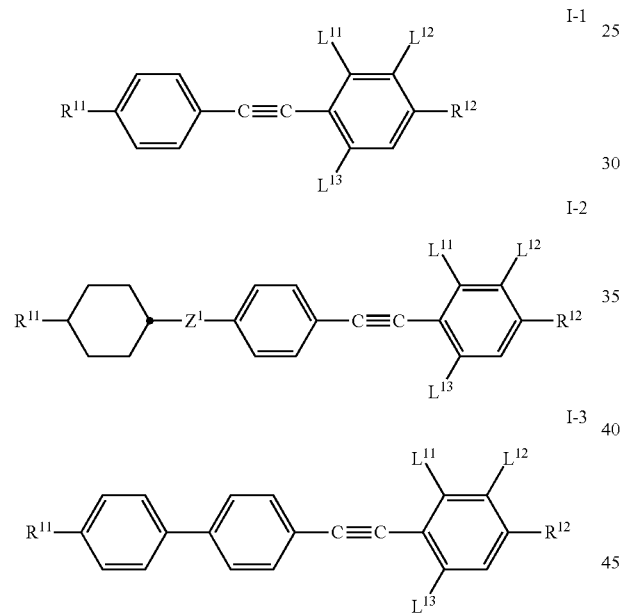

in which $R^{11}$ and $R^{12}$ identically or differently, denote H, alkyl or alkoxy having 1 to 12 C atoms, or alkenyl, alkenyloxy or alkoxyalkyl having 2 to 12 C atoms, in which one or more CH$_2$-groups may be replaced by

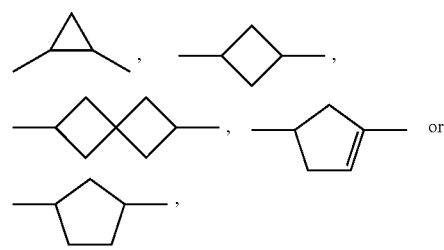

and in which one or more H atoms may be replaced by fluorine, $Z^1$ denotes —CH$_2$CH$_2$— or a single bond, and $L^{11}$, $L^{12}$, $L^{13}$ each, independently of one another, denote H or F;

and

10% to 40% by weight of one or more compounds of formula IIZ

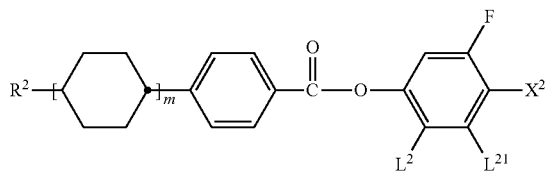

in which $R^2$ denotes H, alkyl or alkoxy having 1 to 12 C atoms, or alkenyl, alkenyloxy or alkoxyalkyl having 2 to 12 C atoms, in which one or more CH$_2$-groups may be replaced by

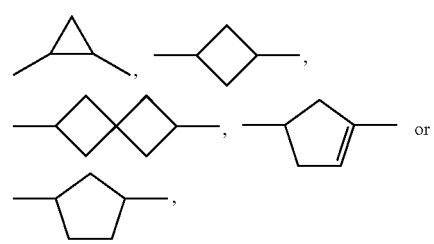

and in which one or more H atoms may be replaced by fluorine, $X^2$ denotes F, Cl, CF$_3$, OCF$_3$, CN or NCS, $L^{21}$ denotes H or F, $L^2$ denotes H or alkyl having 1 to 6 C atoms, and m is 0 or 1;

and one or more compounds of formula III

in which $R^{31}$, $R^{32}$ identically or differently, denote alkyl having 1 to 20 C atoms, which is straight chain or alkyl having 1 to 20 C atoms, which is branched, which is non-substituted, mono- or poly-substituted by F, Cl or CN, and in which one or more CH$_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that O and/or S atoms are not linked directly to one another,

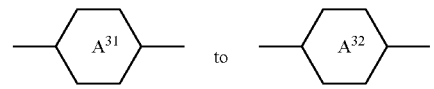

independently of each other, denote

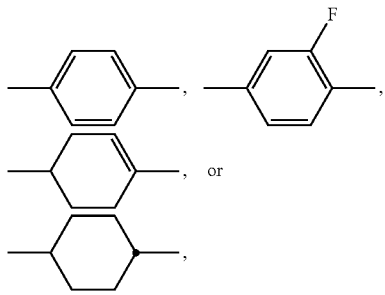

$Z^{31}$ and $Z^{32}$ on each occurrence, identically or differently, denote —CH$_2$CH$_2$—, —CF$_2$CF$_2$—, —CF$_2$CH$_2$—, —COO—, trans-CH=CH—, trans-CF=CF—, —CH$_2$O—, —CF$_2$O—, —C≡C— or a single bond, and p is 0, 1 or 2;
and/or
1% to 10% by weight of one or more compounds of formula VI

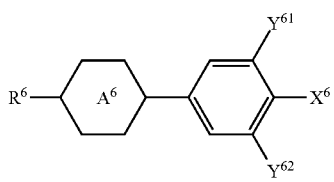 VI in which

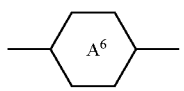

denotes

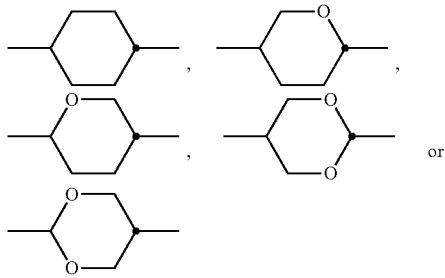

$R^6$ denotes H, alkyl or alkoxy having 1 to 12 C atoms, or alkenyl, alkenyloxy or alkoxyalkyl having 2 to 12 C atoms, in which one or more CH$_2$-groups may be replaced by

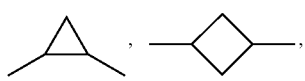

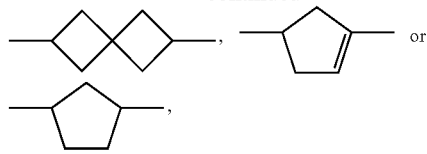

and in all of which one or more H atoms may be replaced by fluorine,
$X^6$ denotes CN, F, CF$_3$ or OCF$_3$ and
$Y^{61}$, $Y^{62}$ identically or differently, denote H, Cl or F;
and wherein the medium has a birefringence of 0.24 or more, and a dielectric anisotropy of 5 to 15.

7. A process for the preparation of the liquid-crystal medium according to claim 6, comprising mixing one or more compounds of formula I-1, one or more compounds of formula I-2, one or more compounds of formula I-3, one or more compounds of formula IIZ, one or more compounds of formula III, and one or more compounds of formula VI with one or more further compounds and/or with one or more additives.

8. A TN display, STN display, PDLC display, phase modulator, camera, mobile phone camera, 3D LCD shutter glass, 3D display, LC lens, holographic projection system, LCoS spatial light modulator or component for high-frequency technology operable in the microwave range, comprising the liquid crystal medium according to claim 6.

9. An electro-optical device component comprising the one or more lenses according to claim 1.

10. The liquid crystal medium according to claim 6, further comprising
one or more compounds of formula III

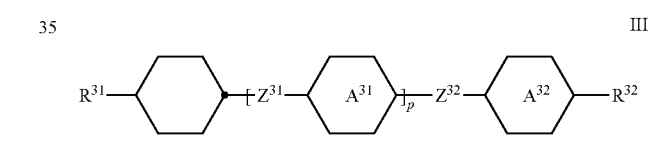 III in which
$R^{31}$, $R^{32}$ identically or differently, denote alkyl having 1 to 20 C atoms, which is straight chain or alkyl having 1 to 20 C atoms, which is branched, which is non-substituted, mono- or poly-substituted by F, Cl or CN, and in which one or more CH$_2$ groups are optionally replaced, in each case independently from one another, by —O—, —S—, —CO—, —COO—, —OCO—, —OCO—O—, —S—CO—, —CO—S—, —CH=CH— or —C≡C— in such a manner that O and/or S atoms are not linked directly to one another,

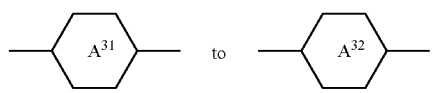

independently of each other, denote

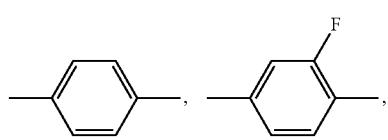

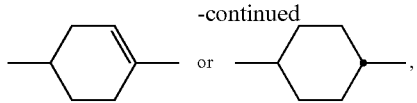 , $Z^{31}$ and $Z^{32}$ on each occurrence, identically or differently, denote —CH$_2$CH$_2$—, —CF$_2$CF$_2$—, —CF$_2$CH$_2$—, —COO—, trans-CH=CH—, trans-CF=CF—, —CH$_2$O—, —CF$_2$O—, —C≡C— or a single bond, and
p is 0, 1 or 2,
and
one or more compounds of formula VI

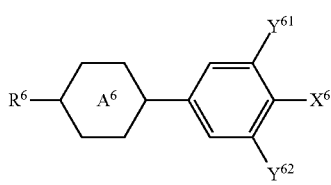

VI in which

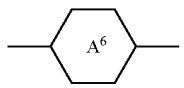

denotes

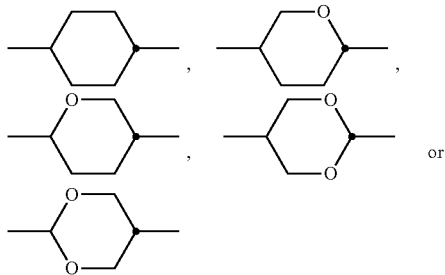

$R^6$ denotes H, alkyl or alkoxy having 1 to 12 C atoms, or alkenyl, alkenyloxy or alkoxyalkyl having 2 to 12 C atoms, in which one or more CH$_2$-groups may be replaced by

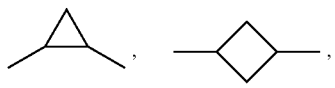 ,

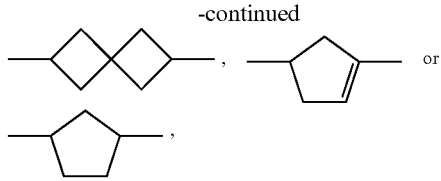

and in all of which one or more H atoms may be replaced by fluorine,
$X^6$ denotes CN, F, CF$_3$ or OCF$_3$, and
$Y^{61}$, $Y^{62}$ identically or differently, denote H, Cl or F.

11. The liquid crystal medium according to claim 6, wherein, in formula IIZ, m is 1.

12. The liquid crystal medium according to claim 6, wherein, in formula IIZ, $X^2$ denotes F, Cl, CF$_3$, OCF$_3$ or CN.

13. The liquid crystal medium according to claim 6, wherein the compound of formula IIZ is the following compound

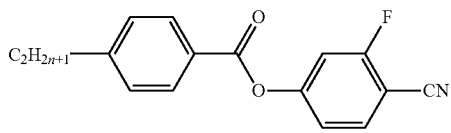

wherein n is 1, 2, 3, 4, 5, 6 or 7.

14. The liquid crystal medium according to claim 6, wherein the compound of formula IIZ is present at 20% to 40% by weight.

15. The lens according to claim 1, wherein, in formula IIZ, m is 1.

16. The lens according to claim 1, wherein, in formula IIZ, $X^2$ denotes F, Cl, CF$_3$, OCF$_3$ or CN.

17. The lens according to claim 1, wherein the compound of formula IIZ is the following compound

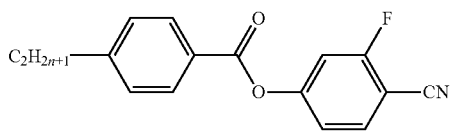

wherein n is 1, 2, 3, 4, 5, 6 or 7.

18. The lens according to claim 1, wherein the compound of formula IIZ is present at 20% to 30% by weight.

19. The liquid crystal medium according to claim 6, which has a Δn of 0.24 to 0.40.

20. The liquid crystal medium according to claim 6, which has a Δn of 0.28 to 0.30.

21. A LC lens, comprising the liquid crystal medium according to claim 6.

22. The lens according to claim 1, wherein the medium has a dielectric anisotropy of 6 to 12.

* * * * *